(12) United States Patent
Tameshige et al.

(10) Patent No.: US 9,852,007 B2
(45) Date of Patent: Dec. 26, 2017

(54) SYSTEM MANAGEMENT METHOD, MANAGEMENT COMPUTER, AND NON-TRANSITORY COMPUTER-READABLE STORAGE MEDIUM

(71) Applicant: HITACHI, LTD., Tokyo (JP)

(72) Inventors: Takashi Tameshige, Tokyo (JP); Yutaka Kudou, Tokyo (JP); Tomohiro Morimura, Tokyo (JP); Takeshi Teramura, Tokyo (JP); Daisuke Iizuka, Tokyo (JP); Nobuaki Ozaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 30 days.

(21) Appl. No.: 14/909,770

(22) PCT Filed: Feb. 12, 2014

(86) PCT No.: PCT/JP2014/053199
§ 371 (c)(1),
(2) Date: Feb. 3, 2016

(87) PCT Pub. No.: WO2015/121925
PCT Pub. Date: Aug. 20, 2015

(65) Prior Publication Data
US 2016/0188373 A1 Jun. 30, 2016

(51) Int. Cl.
*G06F 9/46* (2006.01)
*G06F 9/50* (2006.01)
*G06F 11/34* (2006.01)

(52) U.S. Cl.
CPC .............. *G06F 9/5038* (2013.01); *G06F 9/50* (2013.01); *G06F 9/5077* (2013.01);
(Continued)

(58) Field of Classification Search
None
See application file for complete search history.

(56) References Cited

U.S. PATENT DOCUMENTS 6,044,222 A * 3/2000 Simons .................. G06F 8/4452
712/207
7,010,789 B1 * 3/2006 Kimelman ............ G06F 9/5066
718/100

(Continued)

FOREIGN PATENT DOCUMENTS

| JP | 2008-225995 A | 9/2008 |
| JP | 2010-237901 A | 10/2010 |
| WO | 2011/138879 A1 | 11/2011 |

*Primary Examiner* — Mehran Kamran
(74) *Attorney, Agent, or Firm* — Volpe and Koenig, P.C.

(57) ABSTRACT

A system management method for a management computer coupled to a computer system, the computer system including a plurality of computers, an operations system being built thereon the computer system, the operations system including a plurality of task nodes each having allocated thereto computer resources, the system management method including: a step of analyzing a configuration of the computer system for specifying a important node, which is an important task node in the operations system; a step of changing an allocation amount of the computer resources allocated to the important node for measuring a load of the operations system; a step of calculating a first weighting representing a strength of associations among the plurality of task nodes based on a measurement result of the load; and a step of specifying a range impacted by a change in the load of the important node based on the calculated first weighting.

12 Claims, 23 Drawing Sheets

(52) U.S. Cl.
CPC ............ *G06F 9/5083* (2013.01); *G06F 11/34* (2013.01); *G06F 11/3433* (2013.01); *G06F 11/3409* (2013.01); *G06F 2201/815* (2013.01)

(56) References Cited

U.S. PATENT DOCUMENTS

| | | | | |
|---|---|---|---|---|
| 8,862,743 | B1* | 10/2014 | Petrescu-Prahova | G06F 9/5077 709/219 |
| 9,329,924 | B2* | 5/2016 | Mikami | G06F 11/079 |
| 2004/0054997 | A1* | 3/2004 | Katragadda | G06F 9/5044 718/102 |
| 2004/0198372 | A1* | 10/2004 | Auterinen | H04L 45/00 455/453 |
| 2006/0064690 | A1* | 3/2006 | Hamadi | G06N 5/02 718/100 |
| 2008/0228755 | A1* | 9/2008 | Haga | G06F 11/008 |
| 2013/0227589 | A1* | 8/2013 | Mikami | G06F 11/327 719/318 |
| 2013/0286893 | A1* | 10/2013 | Zhu | H04L 45/64 370/254 |
| 2014/0280949 | A1* | 9/2014 | Anantharam | H04L 67/1008 709/226 |
| 2016/0188373 | A1* | 6/2016 | Tameshige | G06F 9/50 718/103 |

* cited by examiner

FIG. 5

TOPOLOGY MANAGEMENT TABLE (320)

| IDENTIFIER (501) | UUID (502) | PHYSICAL NODE IDENTIFIER (503) | DEVICE NAME (504) | PROPERTY (505) | COUPLING DESTINATION DEVICE NAME (506) | RELIABILITY TYPE (507) | EIGEN VALUE (508) |
|---|---|---|---|---|---|---|---|
| 1 | UUID1 | SERVER1 | --- | PROCESSOR :3GHz/core:4 memory:4GB HDD(SAS):120GB NIC:1Gbps, HBA:3Gbps | SERVER2 | DR | 1,000 |
| 2 | UUID2 | SERVER1 | PROCESSOR1 | PROCESSOR TYPE, ARCHITECTURE TYPE, CLOCK FREQUENCY, PROCESSOR GENERATION, MODEL NUMBER, SUPPORT FUNCTION, VENDOR TYPE | PCI Bus | --- | --- |
| 3 | UUID3 | SERVER1 | MEMORY 1 | MEMORY TYPE, OPERATION FREQUENCY, MODEL NUMBER, VENDOR TYPE | PCI Bus | ECC | 1.0 |
| 4 | UUID4 | SERVER1 | NIC1 | PERFORMANCE INFORMATION, VENDOR TYPE, FIRMWARE TYPE, FIRMWARE GENERATION, SUPPORT FUNCTION, IDENTIFIER, DRIVER TYPE, DRIVER VERSION | NIC5 SERVER2 | AGGREGATION NIC1 SERVER1 | 5.0 |
| 5 | UUID5 | SERVER1 | HBA1 | PERFORMANCE INFORMATION, VENDOR TYPE, FIRMWARE TYPE, FIRMWARE GENERATION, SUPPORT FUNCTION, IDENTIFIER, DRIVER TYPE, DRIVER VERSION | FC-Port 1 CONTROLLER1 STORAGE APPARATUS1 | AGGREGATION | 10 |
| 6 | UUID6 | SERVER1 | SSD1 | DEVICE TYPE (SLC), I/F TYPE, I/F CONNECTION SPEED, VENDOR TYPE, DRIVER TYPE, DRIVER VERSION | PCI Bus | RAID5 | 100 |
| 7 | UUID7 | SWITCH 1 | IP-port 1 | SWITCH TYPE (L2), VENDOR NAME, SUPPORT FUNCTION, FIRMWARE VERSION | NIC3 | MULTIPLEXING | 20 |
| ... | ... | ... | ... | ... | ... | ... | ... |

LOGICAL CONFIGURATION MANAGEMENT TABLE 321

| 601 IDENTIFIER | 602 UUID | 603 LOGICAL NODE IDENTIFIER | 604 TYPE | 605 ADJUSTMENT METRIC | 606 ADJUSTMENT PARAMETER | 607 PHYSICAL NODE IDENTIFIER | 608 SYSTEM CONFIGURATION | 609 CASCADE CONNECTION | 610 EIGEN VALUE |
|---|---|---|---|---|---|---|---|---|---|
| 1 | UUID1 | VM1 | Scale out / Scale in | SERVER 1. PROCESSOR 2. I/O 3. MEMORY | OS kernel PARAMETER TIMEOUT VALUE CACHE AMOUNT | SERVER1 | SCALE OUT TYPE 1.0 UUID2, UUID3 | UUID4 | 1.0 |
| 2 | UUID2 | VM2 | Scale out / Scale in | SERVER 1. PROCESSOR 2. I/O 3. MEMORY | OS kernel PARAMETER TIMEOUT VALUE CACHE AMOUNT | SERVER1 | SCALE OUT TYPE 1.0 UUID3, UUID1 | UUID4 | 1.0 |
| 3 | UUID3 | VM3 | Scale out / Scale in | SERVER 1. PROCESSOR 2. I/O 3. MEMORY | OS kernel PARAMETER TIMEOUT VALUE CACHE AMOUNT | SERVER1 | SCALE OUT TYPE 1.0 UUID1, UUID2 | UUID4 | 5.0 |
| 4 | UUID4 | VM4 | Scale up / Scale down | SERVER 1. PROCESSOR 2. I/O 3. MEMORY | OS kernel PARAMETER RAID WRITE SIZE TIMEOUT VALUE CACHE AMOUNT | SERVER1 | SCALE UP TYPE 100 --- | UUID1 UUID2 UUID3 | 1,000 |
| 5 | UUID5 | VM5 | Scale out / Scale in | SERVER 1. PROCESSOR | OS kernel PARAMETER | SERVER1 | MESH TYPE 10 UUID6 | UUID6 | 5.0 |
| 6 | UUID6 | VM6 | Scale out / Scale in | SERVER 1. PROCESSOR | OS kernel PARAMETER MULTIPLICITY | SERVER1 | MESH TYPE 10 UUID5 | UUID5 | 5.0 |
| ... | ... | ... | ... | ... | ... | ... | ... | ... | ... |

FIG. 6

TASK MANAGEMENT TABLE 322

| TASK IDENTIFIER 701 | UUID 702 | TASK SOFTWARE NAME 703 | TASK SETTING INFORMATION 704 | PRIORITY ORDER 705 | EIGEN VALUE 706 |
|---|---|---|---|---|---|
| TASK1 | UUID 401 | SOFTWARE A | ID 431, Password 441, DiskImage 451, PortNumber 461 | PRIORITY ORDER :1 Request: VMware FT | 1,000 |
| TASK2 | UUID 402 | SOFTWARE B | ID 432, Password 442, DiskImage 452, PortNumber 462 | PRIORITY ORDER :4 Request: COLD STANDBY | 1 |
| TASK3 | UUID 403 | SOFTWARE B | ID 433, Password 443, DiskImage 453, PortNumber 463 | PRIORITY ORDER :2 Request: HOT STANDBY | 500 |
| TASK4 | UUID 404 | SOFTWARE B | ID 434, Password 444, DiskImage 454, PortNumber 464 | PRIORITY ORDER :3 Request: HOT STANDBY | 100 |
| TASK5 | UUID 405 | SOFTWARE C | ID 435, Password 445, DiskImage 455, PortNumber 465 | PRIORITY ORDER :5 Request: NIC AGGREGATION | 0.1 |
| ... | ... | ... | ... | ... | ... |

FIG. 7

NODE MANAGEMENT TABLE 323

| TASK NODE IDENTIFIER 801 | UUID 802 | ASSIGNED NODE IDENTIFIER 803 | TASK TYPE 804 | TASK IDENTIFIER 805 | ASSOCIATED NODE IDENTIFIER 806 | ASSOCIATED INFORMATION 807 |
|---|---|---|---|---|---|---|
| TASK NODE 1 | UUID 401 | SERVER1 | DB | TASK 1 | TASK NODE 2<br>TASK NODE 3 | SOFTWARE A : PHYSICAL SERVER<br>SOFTWARE B : VM (SEPARATE)<br>SOFTWARE B : VM (SEPARATE) STORAGE |
| TASK NODE 2 | UUID 402 | VM1 | AP | TASK 5 | TASK NODE1<br>TASK NODE4<br>TASK NODE5<br>TASK NODE6<br>TASK NODE7 | SOFTWARE B : VM<br>SOFTWARE C : VM (SEPARATE)<br>SOFTWARE C : VM (SEPARATE)<br>SOFTWARE C : PHYSICAL SERVER (SEPARATE) ⎤ CLUSTER<br>SOFTWARE C : PHYSICAL SERVER (SEPARATE) ⎦ |
| ... | ... | ... | ... | ... | ... | ... |
| TASK NODE 4 | UUID 404 | VM2 | WEB | TASK 3 | TASK NODE2<br>TASK NODE3<br>TASK NODE8 | SOFTWARE B : VM (SEPARATE)<br>SOFTWARE B : VM (SEPARATE)<br>SOFTWARE C : VM (SEPARATE)<br>SOFTWARE C : VM (SEPARATE)<br>SOFTWARE C : PHYSICAL SERVER (SEPARATE) ⎤ CLUSTER<br>SOFTWARE C : PHYSICAL SERVER (SEPARATE) ⎦<br>SOFTWARE D : PHYSICAL SERVER |
| ... | ... | ... | ... | ... | ... | ... |
| TASK NODE 8 | UUID 408 | SERVER5 | LB | TASK 9 | TASK NODE4<br>TASK NODE5<br>TASK NODE6<br>TASK NODE7 | SOFTWARE C : VM (SEPARATE)<br>SOFTWARE C : VM (SEPARATE)<br>SOFTWARE C : PHYSICAL SERVER (SEPARATE) ⎤ CLUSTER<br>SOFTWARE C : PHYSICAL SERVER (SEPARATE) ⎦<br>SOFTWARE D : PHYSICAL SERVER |

FIG. 8

THRESHOLD MANAGEMENT TABLE

| IDENTIFIER | TASK IDENTIFIER | THRESHOLD |
|---|---|---|
| 1 | TASK 1 | 1,100 |
| 2 | TASK 2 | 50 |
| 3 | TASK 3 | 600 |
| ⋮ | ⋮ | ⋮ |

*FIG. 9*

ADJUSTMENT METHOD MANAGEMENT TABLE

| IDENTIFIER | NODE TYPE | ADJUSTMENT METHOD | | PRIORITY |
| | | ADJUSTMENT PARAMETER TYPE | ADJUSTMENT VALUE | |
|---|---|---|---|---|
| 1 | VM | PROCESSOR ALLOCATION RATIO | -10%(-90%) | 1 |
| 2 | VM | PROCESSOR USAGE | CAPPED AT 50% | 2 |
| 3 | VM | I/O BANDWIDTH | -20% | --- |
| 4 | VM | AMOUNT OF ALLOCATED MEMORY | -50% With reboot | --- |
| 5 | VM | NUMBER OF VMs | -1 | --- |
| 6 | VM | NUMBER OF PROCESSOR CORES | vPROCESSOR -1 With reboot | --- |
| 7 | vSW | NIC | RELEASE BONDING | --- |
| ⋮ | ⋮ | ⋮ | ⋮ | ⋮ |

*FIG. 10*

SYSTEM PERFORMANCE TABLE

| IDENTIFIER | IMPORTANT NODE IDENTIFIER | ASSOCIATED NODE IDENTIFIER | PERFORMANCE CHARACTERISTIC FUNCTION | |
|---|---|---|---|---|
| | | | ADJUSTMENT PARAMETER TYPE | FUNCTION |
| 1 | TASK NODE 1 | TASK NODE 2 | PROCESSOR ALLOCATION RATIO | $Y = aX^2 + bX + c$ |
| | | | NUMBER OF PROCESSOR CORES | $Y = dX + e$ |
| | | | ⋮ | ⋮ |
| | | TASK NODE 4 | AMOUNT OF ALLOCATED MEMORY | $Y = fX + g$ |
| | | | ⋮ | ⋮ |
| | | TASK NODE 7 | PROCESSOR ALLOCATION RATIO | $Y = hX^3 + iX + j$ |
| | | | NUMBER OF PROCESSOR CORES | $Y = kX + m$ |
| | | | NIC | $Y = pX + q$ |
| | | | ⋮ | ⋮ |
| 2 | TASK NODE 2 | TASK NODE 1 | NUMBER OF PROCESSOR CORES | $Y = dX + e$ |
| | | TASK NODE 4 | NUMBER OF VMs | $Y = rX^{(-1)} + s$ |
| ⋮ | ⋮ | ⋮ | ⋮ | ⋮ |

*FIG. 11*

WEIGHTING MANAGEMENT TABLE

| IDENTIFIER | TYPE | PARAMETER TYPE | TASK NODE IDENTIFIER | WEIGHTING |
|---|---|---|---|---|
| 1 | NODE | --- | TASK NODE1 | 1.0 |
| 2 | NODE | --- | TASK NODE2 | 0.5 |
| 3 | NODE | --- | TASK NODE3 | 1.0 |
| 4 | NODE | --- | TASK NODE4 | 100 |
| 5 | NODE | --- | TASK NODE5 | 2.0 |
| 6 | NODE | --- | TASK NODE6 | 10 |
| 7 | NODE | --- | TASK NODE7 | 1.0 |
| 8 | NODE | --- | TASK NODE8 | 1,000 |
| ⋮ | ⋮ | ⋮ | ⋮ | ⋮ |
| 101 | EDGE | NUMBER OF PROCESSOR CORES | TASK NODE1, TASK NODE2 | 1.0 |
| 102 | EDGE | NUMBER OF PROCESSOR CORES | TASK NODE1, TASK NODE3 | $0.8 * m$ |
| 103 | EDGE | NUMBER OF PROCESSOR CORES | TASK NODE1, TASK NODE3 | 50 |
| 104 | EDGE | NUMBER OF PROCESSOR CORES | TASK NODE1, TASK NODE4 | 0.5 |
| 105 | EDGE | NUMBER OF PROCESSOR CORES | TASK NODE1, TASK NODE5 | 5.0 |
| 106 | EDGE | NUMBER OF PROCESSOR CORES | TASK NODE1, TASK NODE6 | 1,000 |
| 107 | EDGE | NUMBER OF PROCESSOR CORES | TASK NODE1, TASK NODE7 | 10 |
| ⋮ | ⋮ | ⋮ | ⋮ | ⋮ |

*FIG. 12*

$$\begin{array}{c} \phantom{1} \quad 1 \quad\; 2 \quad\; 3 \quad\; 4 \;\cdots \\ \begin{array}{c} 1 \\ 2 \\ 3 \\ 4 \\ \vdots \end{array} \left( \begin{array}{|c|c|c|c|c} \hline A_{11} & A_{12} & A_{13} & A_{14} & \cdots \\ \hline A_{21} & A_{22} & A_{23} & A_{24} & \\ \hline A_{31} & A_{32} & A_{33} & A_{34} & \\ \hline A_{41} & A_{34} & A_{43} & A_{44} & \\ \hline \vdots & & & & \end{array} \right) \end{array}$$

DIAGONAL COMPONENT: NODE
OFF-DIAGONAL COMPONENT: EDGE

*FIG. 13*

RULE MANAGEMENT TABLE 328

| TASK IDENTIFIER | UUID | TASK TYPE | ASSOCIATED INFORMATION | PRIORITY ORDER | RULE |
|---|---|---|---|---|---|
| TASK 1 | UUID 401 | DB | SOFTWARE A : PHYSICAL SERVER<br>SOFTWARE B : VM (SEPARATE)<br>SOFTWARE B : VM (SEPARATE)<br>STORAGE | 1 | 1. VM SCALE OUT: SOFTWARE B<br>2. vPROCESSOR ADDED ALLOCATION : SOFTWARE B<br>3. DB (TASK 1) ADDITION<br>4. STORAGE TIER Up/Down: SOFTWARE A |
| TASK 2 | UUID 402 | AP | SOFTWARE B : VM<br>SOFTWARE C : VM (SEPARATE)<br>SOFTWARE C : VM (SEPARATE)<br>SOFTWARE C : PHYSICAL SERVER (SEPARATE) ⎫ CLUSTER<br>SOFTWARE C : PHYSICAL SERVER (SEPARATE) ⎭ | 4 | 1. VM SCALE OUT: SOFTWARE C<br>2. ALERT: SOFTWARE C |
| TASK 3 | UUID 403 | Web | SOFTWARE B : VM<br>SOFTWARE C : VM (SEPARATE)<br>SOFTWARE C : VM (SEPARATE)<br>SOFTWARE C : PHYSICAL SERVER (SEPARATE) ⎫ CLUSTER<br>SOFTWARE C : PHYSICAL SERVER (SEPARATE) ⎭ | 2 | 1. NETWORK BAND ADDITION: SOFTWARE C<br>2. STORAGE TIER Up/Down: SOFTWARE C |
| TASK 4 | UUID 404 | Web | SOFTWARE D : PHYSICAL SERVER (SEPARATE)<br>SOFTWARE D : PHYSICAL SERVER (SEPARATE)<br>SOFTWARE E : VM | 3 | 2. VM SCALE OUT: SOFTWARE E<br>3. vPROCESSOR ADDED ALLOCATION: SOFTWARE E<br>4. vMemoriy ADDED ALLOCATION: SOFTWARE E |
| ... | ... | ... | ... | ... | ... |

MEASUREMENT RESULT

| IMPORTANT NODE IDENTIFIER | ADJUSTMENT PARAMETER TYPE | TASK NODE IDENTIFIER | PARAMETER VALUE | MEASUREMENT VALUE |
|---|---|---|---|---|
| TASK NODE 1 | PROCESSOR ALLOCATION RATIO | TASK NODE 1 | -10% | 1,0000 |
| | | | -20% | 8,000 |
| | | | ⋮ | ⋮ |
| | | TASK NODE 2 | ⋮ | ⋮ |
| | | ⋮ | ⋮ | ⋮ |
| | NUMBER OF PROCESSOR CORES | TASK NODE 1 | vPROCESSOR -1 | 7,000 |
| | | | vPROCESSOR -2 | 4,800 |
| | | | ⋮ | ⋮ |
| ⋮ | ⋮ | ⋮ | ⋮ | ⋮ |

SYSTEM MANAGEMENT METHOD, MANAGEMENT COMPUTER, AND NON-TRANSITORY COMPUTER-READABLE STORAGE MEDIUM

BACKGROUND OF THE INVENTION

This invention relates to a method of managing an operations system built on a computer system including a plurality of computers.

Along with the developments in cloud computing in recent years, the number of data centers operating computer resources as a resource pool is increasing. A provider of the data center builds an operations system for a user in the data center by allocating predetermined computer resources from the resource pool based on a user request. The user provides a predetermined service, such as a Web service, by using the operations system built in the data center.

In order to operate the resource pool, it is important for the provider to grasp the performance limits of the systems in the data center, and expand the scale of the data center as necessary. In general, the scale of the data center is expanded by increasing the computer resources of the data center by scaling out.

A method of managing a computer system is described in JP 2008-225995 A, for example. In JP 2008-225995 A, there is described "a policy creation support method for a policy creation support system used in order to control a system to be monitored so as to satisfy a contract condition, the policy creation support system being configured to support creation of a policy that contains a condition indicating a state of the system to be monitored and an action to be executed when the state of the system to be monitored satisfies the condition. The condition contains a monitoring item serving as an item to be monitored in the system to be monitored and a range of a measurement value of the monitoring item. The policy creation support system is configured to execute a holding step of holding a template for designating a type of the monitoring item required for the creation of the policy, an obtaining step of obtaining the measurement value of each resource amount of a resource to be expanded for each monitoring item corresponding to the type designated by the template, a selecting step of selecting one representative measurement value from among the measurement values for each resource amount for each monitoring item corresponding to the type designated by the template, and an output step of outputting the monitoring item, the resource amount of the monitoring item, and the range of the measurement value corresponding to the resource amount, for each monitoring item corresponding to the type designated by the template by setting a range including the selected representative measurement value as the range of the measurement value."

However, the computer system and the operations system are independent of each other. Further, the configuration of the operations system is different for each user. Therefore, the performance limits of the computer system and operations system cannot be easily grasped. As a result, it is difficult to estimate the limits of scaling out, and difficult to estimate the units for increasing the computer resources. In addition, what kind of expansion to perform depends on the configuration of the computer system and operations system.

Further, the method used to deal with system changes is different for each data center depending on the situation, such as when the performance of the computer resources of the data center is not uniform, when clusters are formed in the data center, when the data center is built only from low-cost servers, or the like. The configuration of the operations system also suffers from the same problem. Therefore, for a data center unable to handle system changes simply by scaling out, it is difficult to estimate the performance limits of the computer system and operations system.

SUMMARY OF THE INVENTION

It is an object of this invention to estimate performance limits of a computer system and an operations system by performing an effective stress test based on the associations of each of a plurality of nodes constructing the operations system.

The present invention can be appreciated by the description which follows in conjunction with the following figures, wherein: a system management method for a management computer coupled to a computer system, the management computer including: a first processor; a first memory coupled to the first processor; and a first interface coupled to the first processor. The computer system includes a plurality of computers, each of the plurality of computers includes: a second processor; a second memory coupled to the second processor; and a second interface coupled to the second processor. An operations system is built on the computer system. The operations system includes a plurality of task nodes each having allocated thereto one of computer resources of one computer among the plurality of computers and computer resources of a virtual computer generated on at least one computer among the plurality of computers. The system management method includes: a first step of analyzing, by the management computer, a configuration of the computer system for specifying at least one important node, which is an important task node in the operations system; a second step of changing, by the management computer, an allocation amount of the computer resources allocated to the at least one important node for measuring a load of the operations system; a third step of calculating, by the management computer, a first weighting representing a strength of associations among the plurality of task nodes based on a measurement result of the load; and a fourth step of specifying, by the management computer, a range impacted by a change in the load of the at least one important node based on the calculated first weighting.

According to one embodiment of this invention, the load on the operations system may be measured by focusing on important nodes specified based on the configuration of the computer system from which the operations system is built. Further, the impact range of the important nodes may be specified based on the strength of the associations among the task nodes. As a result, the performance limit of the operations system may be estimated.

Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIG. 5 is an explanatory diagram for illustrating an example of a topology management table of the first embodiment;

FIG. 6 is an explanatory diagram for illustrating an example of a logical configuration management table of the first embodiment;

FIG. 7 is an explanatory diagram for illustrating an example of a task management table of the first embodiment;

FIG. 8 is an explanatory diagram for illustrating an example of a node management table of the first embodiment;

FIG. 9 is an explanatory diagram for illustrating an example of a threshold management table of the first embodiment;

FIG. 10 is an explanatory diagram for illustrating an example of an adjustment method management table of the first embodiment;

FIG. 11 is an explanatory diagram for illustrating an example of a system performance table of the first embodiment;

FIG. 12 is an explanatory diagram for showing an example of a weighting management table of the first embodiment;

FIG. 13 is an explanatory diagram for showing an example of a chart of the weighting management table of the first embodiment in matrix form;

FIG. 14 is an explanatory diagram for illustrating an example of a rule management table of the first embodiment;

FIG. 18 is an explanatory diagram for illustrating an example of a measurement result of the first embodiment;

DETAILED DESCRIPTION OF THE PREFERRED EMBODIMENTS

Figure 1:
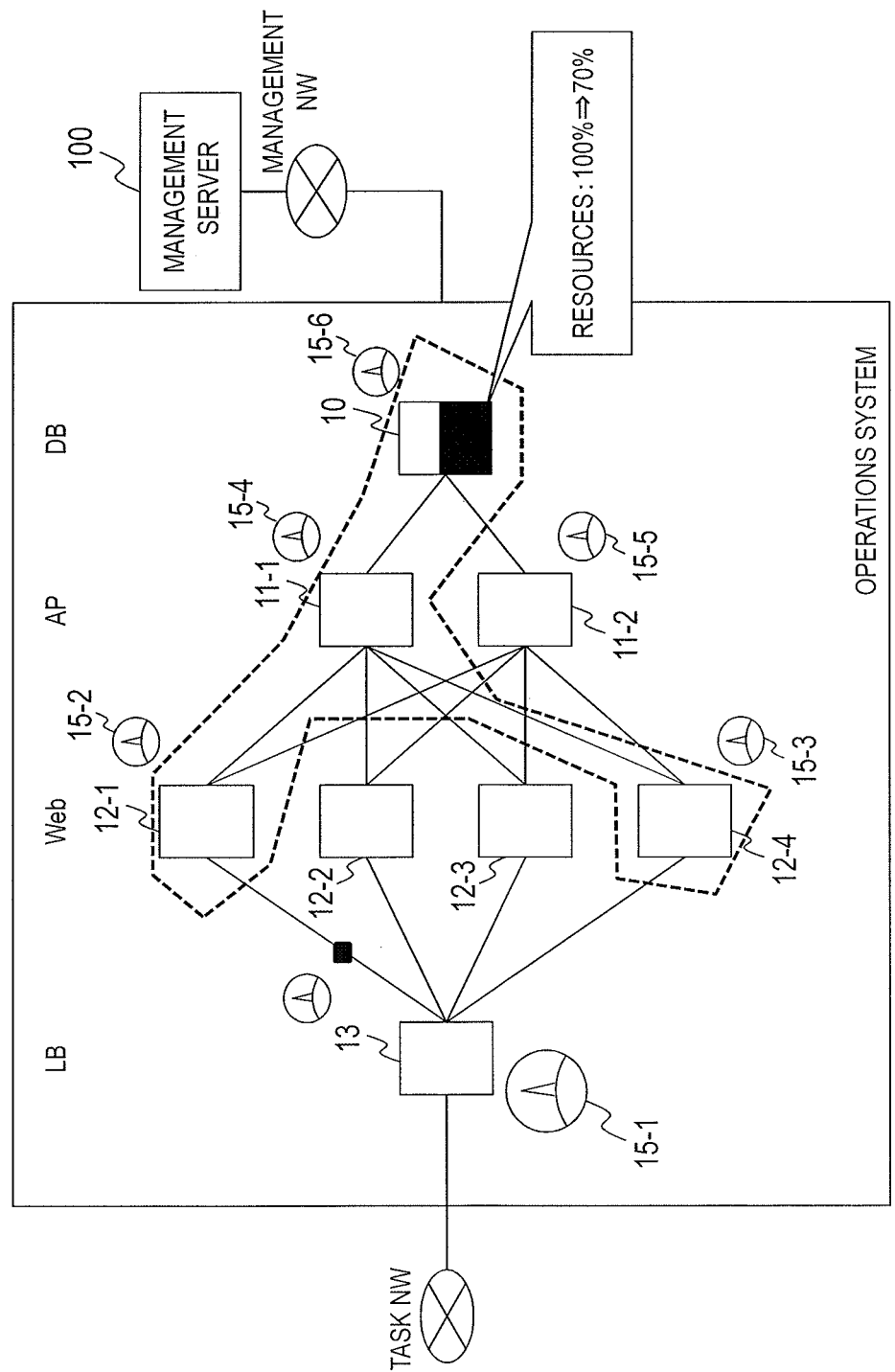
FIG. 1 is a block diagram for illustrating an outline of an embodiment of this invention.

FIG. 1 is a block diagram for illustrating an outline of an embodiment of this invention.

In FIG. 1, an operations system configured to execute predetermined tasks and a management server 100 configured to manage the operations system are coupled to each other via a management network. Further, the operations system is coupled to an external network via a task network.

The operations system illustrated in FIG. 1 includes one database server 10, two application servers 11, four Web servers 12, and one load balancer 13. In the following description, the elements, such as the database server, constructing the operations system are also referred to as task nodes.

The operations system is built on a computer system providing computer resources. The computer system includes a physical layer built from physical computers, physical switches, and the like, and a logical layer built from virtual computers realized using physical computers, virtual switches realized using physical switches, and the like. In the following description, the physical computers and the like constructing the physical layer are also referred to as physical nodes, and the virtual computers and the like constructing the logical layer are also referred to as logical nodes.

The task nodes are realized using the physical nodes and the logical nodes. For example, in realizing the database server 10, the database server may be realized using a blade server 223, which is a physical node, or the database server may also be realized using a virtual computer, namely, a logical node, created on the blade server 223.

This embodiment is directed to estimating a performance limit of the operations system. In order to estimate the performance limit, task nodes having strict performance requirements in the operations system are specified, and a stress test is carried out on the specified task nodes based on a sequence such as that described below.

(1) First, the management server 100 specifies important task nodes in the operations system based on the configuration of the operations system, and the configuration of the computer system from which the operations system is built. In the following description, the important task nodes are also referred to as important nodes.

(2) The management server 100 carries out a stress test on the important nodes, and measures the impact on the overall operations system.

(3) Based on the measurement result of the stress test, the management server 100 calculates a minimum cut set (impact range), which is a combination of nodes having a large impact on the operations system. It should be noted that the minimum cut set includes one or more important nodes. Further, the management server 100 estimates the size of the impact on the task nodes included in the impact range caused by changes in the load of the important nodes.

Based on the processing such as that described above, the performance limit (performance characteristic) of the operations system can be estimated.

In the example illustrated in FIG. 1, the measurement result of a stress test carried out when the amount of allocated resources of the database server specified as an important node has been reduced by 30% is shown. In this case, a minimum cut set such as that indicated by the dotted line is calculated. In other words, in the operations system, the task nodes that are impacted by the load of the database server, which is an important node, can be specified.

Further, in this embodiment, the management server 100 is configured to execute monitoring processing based on the measurement result of a stress test carried out during operation of the operations system. In this case, the management server 100 displays a meter 15 representing an estimated value of the load of the task nodes included in the impact range, a critical value thereof, or the like. As a result, an estimation can be made regarding whether or not expansion of the computer system and the operations system is necessary.

As a result, an alert can be issued to the provider or to the user before the load of the operations system reaches a certain level or more, which allows countermeasures to be drawn up in advance.

First Embodiment

Figure 2:
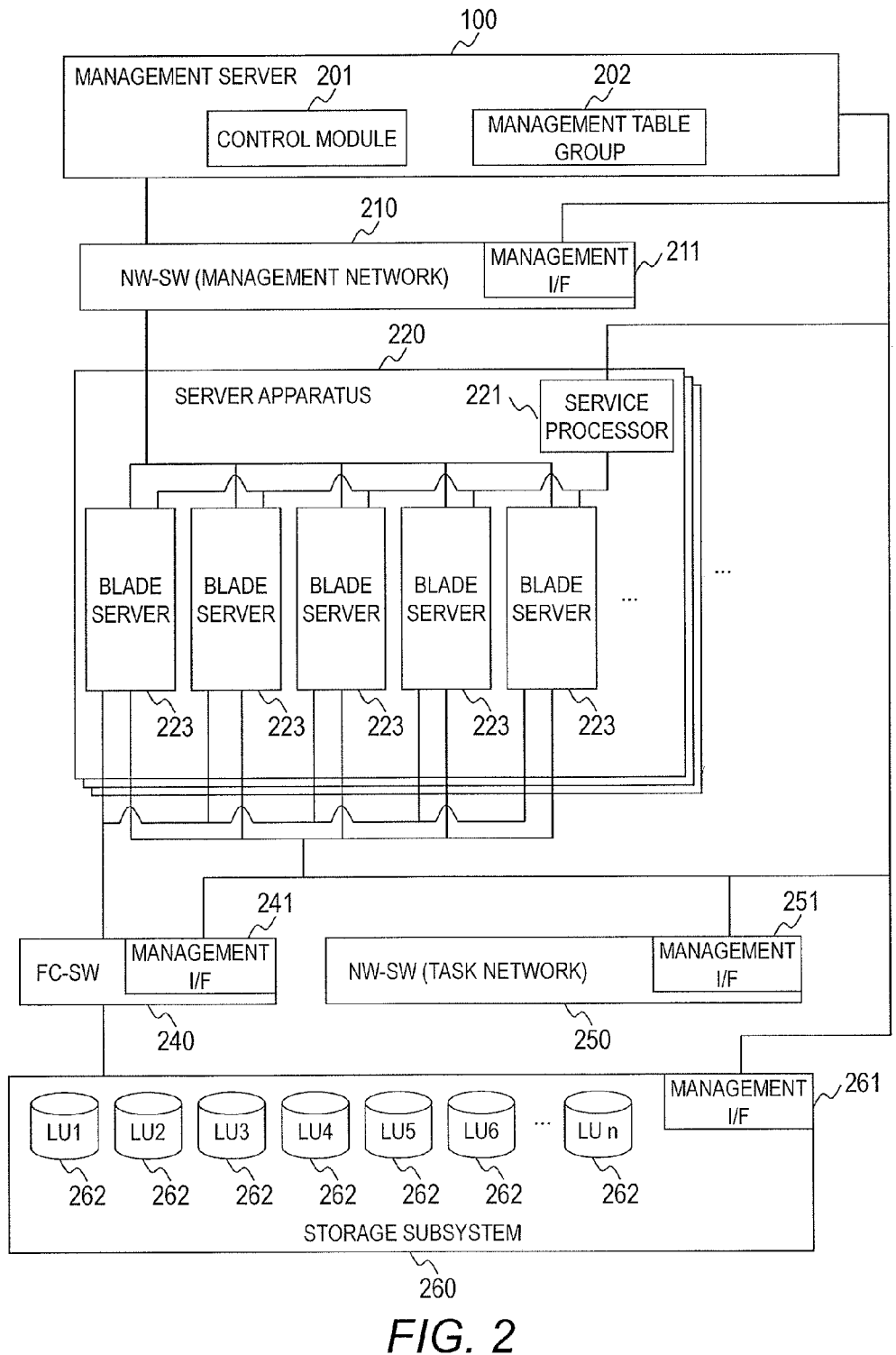
FIG. 2 is an explanatory diagram for illustrating an example of a configuration of a overall system according to a first embodiment of this invention.

FIG. 2 is an explanatory diagram for illustrating an example of a configuration of the overall system according to a first embodiment of this invention.

The system according to the first embodiment includes a management server 100 and a computer system from which the operations system is built. The computer system, which is a system providing computer resources, includes a plurality of server apparatus 220, a storage subsystem 260, an NW-SW 250, and an FC-SW 140.

The management server 100 is configured to manage the computer system. The management server 100 is coupled to a management interface (management I/F) 211 of an NW-SW 210 (management network switch) 210 and a management interface 251 of an NW-SW (task network switch) 250 via the NW-SW 210. The management server 100 can set a virtual local area network (VLAN) to both the NW-SW 210 and the NW-SW 250.

The NW-SW 210 forms a management network. The management network is a network that allows the management server 100 to distribute an operating system (OS) and applications running on the plurality of server apparatus 220, and to operate and manage power control and the like.

The NW-SW 250 forms a task network. The task network is a network used by the applications to be executed by the server apparatus 220 or a virtual machine (VM) on the server apparatus 220. It should be noted that the NW-SW 250 is configured to communicate with an external client computer coupled via a wide area network (WAN) or the like.

In the following description, physical computer resources, such as the server apparatus 220, the FC-SW 140, the NW-SW 250, and the storage subsystem 260, are referred to as physical nodes, and virtual computer resources, such as the VM and the virtual switches, are referred to as logical nodes.

The management server 100 is coupled to a management interface (management I/F) 161 of the storage subsystem 260 via the fiber channel switch (FC-SW) 140. The management server 100 is configured to manage logical units (LUs) 262 in the storage subsystem 260. In the example illustrated in FIG. 1, the management server 100 manages N-number of logical units LU 1 to LU-n.

The management server 100, which includes a control module 201, stores a management table group 202. The management table group 202 contains information on the configuration of the computer system, for example. The control module 201 is configured to execute a stress test (black box test) on the operations system built on the computer system by referring to the information contained in the management table group 202, and update the information contained in the management table group 202 based on the measurement result of the stress test. Details of the configuration of the management server 100 are described later with reference to FIG. 3.

Each server apparatus 220 provides computer resources to be allocated to the task nodes in a manner described later. The server apparatus 220 are coupled to the NW-SW 210 and the NW-SW 250 via an input/output (I/O) device or the like.

Each server apparatus 220 has a service processor 221 and a plurality of blade servers 223 mounted thereon. The service processor 221 is configured to monitor the blade servers 223 mounted on the server apparatus 220. Each server apparatus 220 is coupled to the management server 100 via the service processor 221. The blade servers 223 have an OS and applications running thereon. The software configuration and the hardware configuration of the blade servers 223 are described later with reference to FIG. 4.

It should be noted that one or more VMs may be created on the blade servers 223, and one or more virtual switches may be created on the FC-SW and the NW-SW 250. A virtual switch may also be created on the blade servers 223.

It should be noted that although the server apparatus 220 includes a blade server 223, this embodiment is not limited to this. For example, a common computer including a processor, a memory, a network interface, and the like may be used as the server apparatus 220.

The storage subsystem 260 provides a storage area to be used by the OS and the like running on the server apparatus 220. The storage subsystem 260 includes a controller (not shown), a plurality of storage media (not shown), a disk interface (not shown), and a network interface (not shown). Examples of the storage media include a hard disk drive (HDD) and a solid state drive (SSD).

The controller (not shown), which forms a redundant array of independent disks (RAID) system using a plurality of storage media, is configured to create a plurality of LUs 162 from RAID volumes. The storage subsystem 260 provides the LUs 162 as storage areas to be used by the OS and the like.

Figure 3:
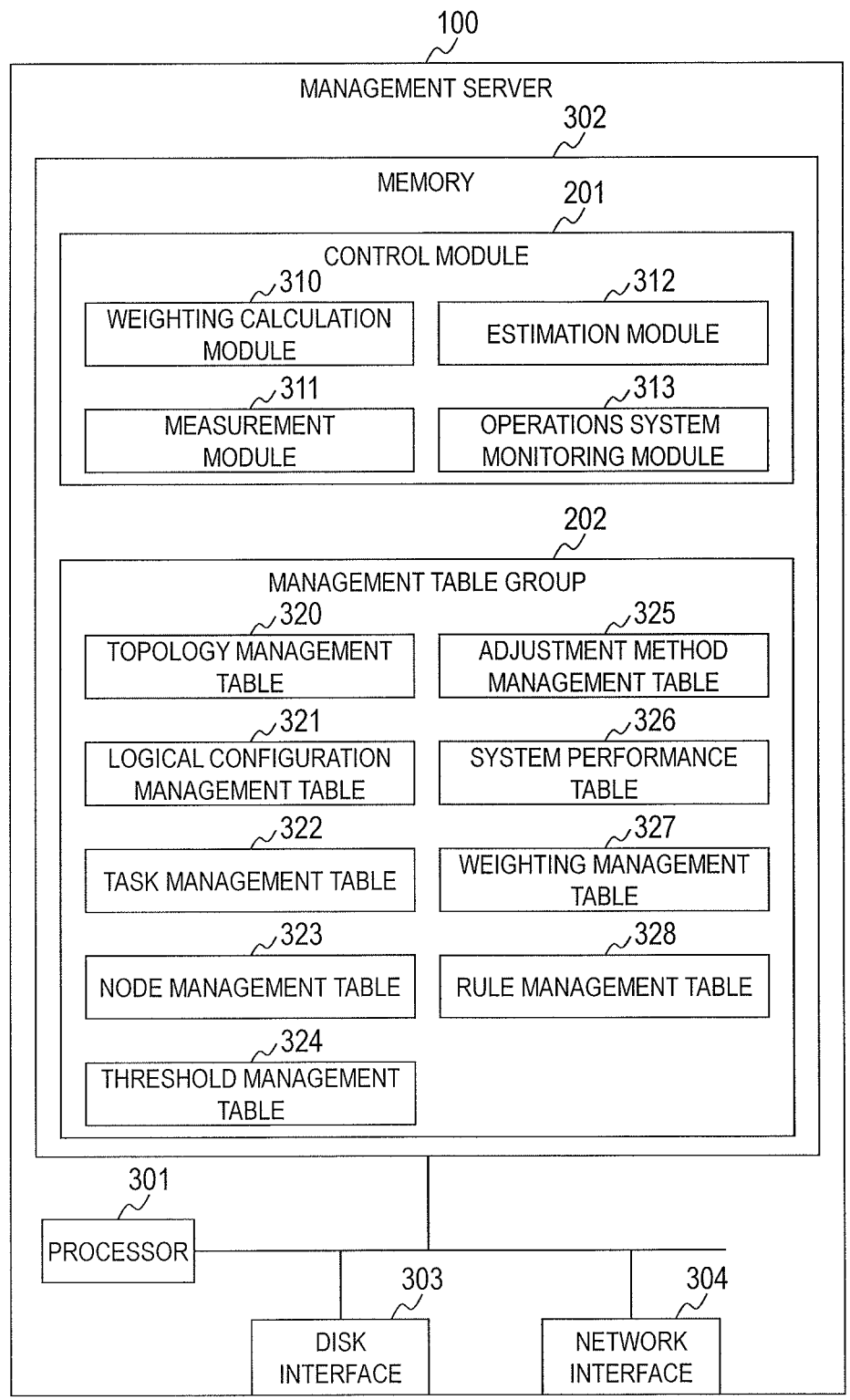
FIG. 3 is a block diagram for illustrating a configuration example of a management server of the first embodiment.

FIG. 3 is a block diagram for illustrating a configuration example of the management server 100 of the first embodiment.

The management server 100 includes a processor 301, a memory 302, a disk interface 303, and a network interface 304.

The processor 301 is configured to execute programs stored in the memory 302. The memory 302 stores programs to be executed by the processor 301 and information required to execute those programs. The programs and information stored in the memory 302 are described later.

The disk interface 303 is an interface for accessing the storage subsystem 260. The network interface 304 is an interface for communicating to/from another apparatus via an Internet protocol (IP) network.

It should be noted that, although not shown in FIG. 3, the management server 100 may also include a basement management controller (BMC) configured to control the power supply and each of the interfaces.

A program for realizing the control module 201 and the management table group 202 are stored in the memory 302. The control module 201 includes a plurality of program modules. Specifically, the control module 201 includes a weighting calculation module 310, a measurement module 311, an estimation module 312, and an operations system monitoring module 313.

The processor 301 is configured to operate as a function module for realizing a predetermined function by operating based on program modules for realizing the weighting calculation module 310, the measurement module 311, the estimation module 312, and the operations system monitoring module 313. For example, by operating based on the program module for realizing the weighting calculation module 310, the processor 301 functions as the weighting calculation module 310. This is the same for the other programs as well.

The weighting calculation module 310 is configured to calculate a weighting for evaluating an importance level of each of a plurality of task nodes in the operations system. The weighting calculation module 310 of the first embodiment calculates the weighting of the task nodes based on the configuration of the physical computer resources (physical nodes) and the configuration of the logical computer resources (logical nodes). Details of the processing executed by the weighting calculation module 310 are described later with reference to FIG. 16.

The measurement module 311 is configured to measure the impact on the operations system by executing the predetermined stress test (black box test) on the task nodes. Details of the processing executed by the measurement module 311 are described later with reference to FIG. 17.

The estimation module 312 is configured to generate information for estimating the performance limit of the operations system based on a measurement result. Details of the processing executed by the estimation module 312 are described later with reference to FIG. 19.

The operations system monitoring module 313 is configured to monitor the operations system based on the information on the performance limit of the operations system, and display a monitoring result. Further, the operations system monitoring module 313 may also display processing results of the weighting calculation module 310, the measurement module 311, and the estimation module 312. Details of the processing executed by the operations system monitoring module 313 are described later with reference to FIG. 20.

The management table group 202 stores various kinds of information for managing the computer system and the operations system. Specifically, the management table group 202 stores a topology management table 320, a logical configuration management table 321, a task management table 322, a node management table 323, a threshold management table 324, an adjustment method management table 325, a system performance table 326, a weighting management table 327, and a rule management table 328.

It should be noted that there is one node management table 323, one system performance table 326, and one weighting management table 327 for each operations system.

The topology management table 320 stores information on the physical nodes. Details of the topology management table 320 are described later with reference to FIG. 5. The logical configuration management table 321 stores information on the logical nodes. Details of the logical configuration management table 321 are described later with reference to FIG. 6. The task management table 322 stores information on the programs to be executed by the operations system. Details of the task management table 322 are described later with reference to FIG. 7. The node management table 323 stores information on the task nodes. Details of the node management table 323 are described later with reference to FIG. 8.

The threshold management table 324 stores a threshold to be used for selecting the important nodes based on the weighting of the task nodes. Details of the threshold management table 324 are described later with reference to FIG. 9. The adjustment method management table 325 stores stress test policies. Details of the adjustment method management table 325 are described later with reference to FIG. 10.

The system performance table 326 stores stress test measurement results. Details of the system performance table 326 are described later with reference to FIG. 11. The weighting management table 327 stores information on the importance level of the task nodes and associations among the task nodes in the operations system. Details of the weighting management table 327 are described later with reference to FIG. 12.

The rule management table 328 stores methods of changing the configuration of the operations system or computer system, and the change content. Details of the rule management table 328 are described later with reference to FIG. 14.

The programs for realizing the control module 201 and each of the tables in the management table group 202 may be stored in the storage subsystem 260, a storage device such as a non-volatile semiconductor memory, a hard disk drive, or a SSD, or a non-transitory computer-readable data storage medium such as an integrated circuit (IC) card, a secure digital (SD) card, or a digital versatile disc (DVD).

It should be noted that the type of server for the management server 100 may be any of a physical server, a blade server, a virtual server, a logically-partitioned or physically-partitioned server, and the like. The effects of this embodiment can be obtained regardless of the type of server that is used.

Figure 4:
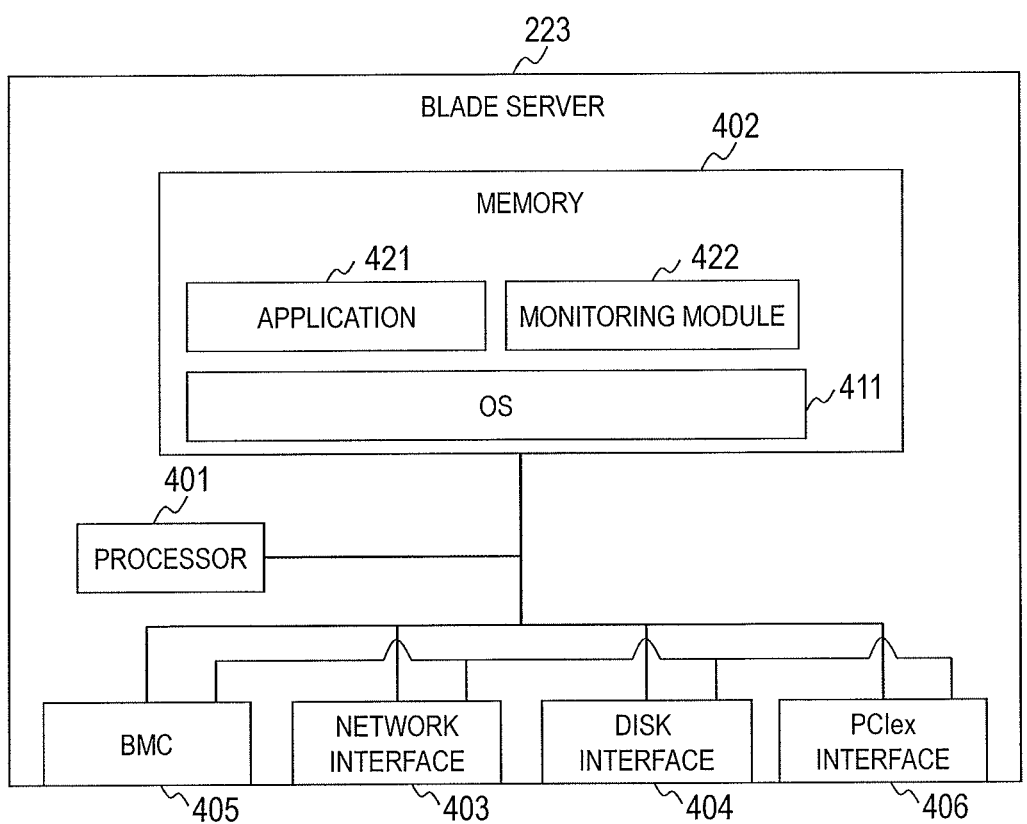
FIG. 4 is a block diagram for illustrating a configuration example of blade servers of the first embodiment.

FIG. 4 is a block diagram for illustrating a configuration example of the blade servers 223 of the first embodiment.

Each blade server 223 includes a processor 401, a memory 402, a network interface 403, a disk interface 404, a BMC 405, and a peripheral component interconnect (PCI) Express interface 406.

The processor 401 is configured to execute programs stored in the memory 402. The memory 402 stores programs to be executed by the processor 401 and information required to execute those programs. The programs and information stored in the memory 302 are described later.

The network interface 403 is an interface for communicating to/from another apparatus via an IP network. The disk interface 404 is an interface for accessing the storage subsystem 260.

The BMC 405 controls the power supply and each of the interfaces. The PCI-Express interface 406 is an interface for coupling to a PCIex-SW.

An OS 411 and programs for realizing an application 421 and a monitoring module 422 are stored in the memory 402. The processor 401 manages the devices in the blade server 223 by executing the OS 411 on the memory 402. The application 421 providing the task and the monitoring module 422 operate under the control of the OS 411.

It should be noted that, as described below, the memory 402 may also store a program for realizing a virtualization module configured to manage a virtual computer.

It should also be noted that in the example illustrated in FIG. 4, one network interface 403, one disk interface 404, and one PCI-Express interface 406 are shown. However, a plurality of each of those interfaces may be arranged. For example, each blade server 223 may include a network interface coupling to the NW-SW 210 and a network interface coupling to the NW-SW 250.

FIG. 5 is an explanatory diagram for illustrating an example of the topology management table 320 of the first embodiment.

The topology management table 320 stores information on the physical configuration of the computer system from which the operations system is built. Specifically, the topology management table 320 includes an identifier 501, a UUID 502, a physical node identifier 503, a device name 504, a property 505, a coupling destination device name 506, a reliability type 507, and an eigenvalue 508.

The identifier 501 is an identifier for uniquely identifying entries in the topology management table 320. The UUID 502 stores a universal unique identifier (UUID), which is an identifier having a format that is defined so as not to be duplicated. The physical node identifier 503 is an identifier for uniquely identifying the physical nodes constructing the physical layer. In this embodiment, an apparatus identifier is used as the identifier of the physical nodes.

The device name 504 is an identifier for uniquely identifying the devices the physical nodes have. In the case of an entry representing a physical node itself, the device name 504 is left blank.

The property 505 is information representing the performance of a physical node itself, or, information representing the performance of the device corresponding to the device name 504. When a port name of the FC-SW 240 is stored in the device name 504, information on a vender type, a RAID configuration, a virtualization type, a support function, a firmware version, and the like is stored in the property 505.

The coupling destination device name 506 stores information on another device coupled to the device corresponding to the device name 504. It should be noted that when the device name 504 is blank, that is, for an entry corresponding to a physical node itself, the identifier of the another physical node connected to the physical node is stored in the coupling destination device name 506. The reliability type 507 is information on the configuration, such as redundancy, of the physical node or of the device corresponding to the coupling destination device name 506.

The eigen value 508 is a value for evaluating the importance level of the physical node or device corresponding to the entry. In other words, the eigen value 508 is a value for evaluating the importance level of the configuration of the physical layer in the computer system. In this case, the configuration of the physical layer includes the hardware configuration and software configuration of the physical nodes, and the connection configuration among the plurality of physical nodes. The eigen value 508 may be set in advance, or may be set by the administrator or the like operating the management server 100.

FIG. 6 is an explanatory diagram for illustrating an example of the logical configuration management table 321 of the first embodiment.

The logical configuration management table 321 stores information on characteristics of the nodes in the operations system. Specifically, the logical configuration management table 321 includes an identifier 601, a UUID 602, a logical node identifier 603, a type 604, an adjustment metric 605, an adjustment parameter 606, a physical node identifier 607, a system configuration 608, a cascade connection 609, and a eigen value 610.

The identifier 601 is an identifier for uniquely identifying entries in the logical configuration management table 321. The logical node identifier 603 is an identifier for uniquely identifying the logical nodes constructing the logical layer. In this embodiment, the identifier of the VM itself and the identifier of the virtual switch itself are used as identifiers of the logical nodes. The type 604 is information representing the type of performance changing method available to the logical nodes.

The adjustment metric 605 is an item measured in order to grasp the load of the logical nodes in the black box test. For example, "CPU", "I/O", and "memory" are stored in the adjustment metric 605 for the entry indicated by "1" in the identifier 601, and hence processor usage, I/O count, memory usage, or the like of logical node 1 is measured. The adjustment parameter 606 is a parameter for performing an adjustment when changing the load on the logical nodes in the black box test.

The physical node identifier 607 is an identifier of a physical node allocating computer resources to a logical node. The physical node identifier 607 is the same as the physical node identifier 503.

The system configuration 608 is information on the configuration of the logical nodes in the logical layer. In the example shown in FIG. 6, "scale out type", "scale up type", and "mesh type" are stored in the system configuration 608 as information representing the configuration of the system. For example, "scale out type" represents a configuration in which logical nodes of the same type perform processing in parallel. Further, a eigen value for the configuration of the logical nodes in the logical layer is set in the system configuration 608. For example, "1.0" is set as the eigen value in the system configuration 608 for the entry indicated by "1" in the identifier 601. In addition, the system configuration 608 stores an identifier of the logical nodes forming a cluster, or, an identifier of logical nodes connected in parallel, for example.

The cascade connection 609 is an identifier of a logical node connected to a logical node corresponding to the logical node identifier 603 in a series configuration. An example of the series configuration is a Web three-tier model. The eigen value 610 is a value for evaluating the importance level of the logical node corresponding to the logical node identifier 603. In other words, the eigen value 610 is a value for evaluating the importance level of the configuration of the logical layer in the computer system. In this case, the configuration of the logical layer includes the hardware configuration and software configuration of the logical nodes, and the connection configuration among the plurality of logical nodes. The eigen value 610 may be set in advance, or may be set by the administrator or the like operating the management server 100.

FIG. 7 is an explanatory diagram for illustrating an example of the task management table 322 of the first embodiment.

The task management table 322 stores information on the tasks to be executed by the operations system. Specifically, the task management table 322 stores a task identifier 701, a UUID 702, a task software name 703, task setting information 704, a priority order 705, and a eigen value 706.

The task identifier 701 is an identifier for uniquely identifying the tasks in the operations system. The task software name 703 is a name of the software to be executed in order to provide a task. The task setting information 704 is setting information required in order to execute the task corresponding to the task identifier 701. The priority order 705 is a priority order of the tasks in the operations system. A smaller value for the priority order 705 indicates a more important task. Further, the priority order 705 also stores information on the configuration required for the task. The eigen value 706 is a value for evaluating the importance level of the task.

FIG. 8 is an explanatory diagram for illustrating an example of the node management table 323 of the first embodiment.

The node management table 323 stores information on the task nodes constructing the operations system. Specifically, the node management table 323 stores a task node identifier 801, a UUID 802, an assigned node identifier 803, a task type 804, a task identifier 805, a connected node identifier 806, and associated information 807.

The task node identifier 801 is an identifier for uniquely identifying task nodes in the operations system.

The assigned node identifier 803 is an identifier of a node providing computer resources to a task node. When a physical node provides computer resources to a task node, the identifier of the physical node is stored in the assigned node identifier 803. When a logical node provides computer resources to a task node, the identifier of the logical node is stored in the assigned node identifier 803.

The task type 804 is the type of task to be executed by the task node. The task identifier 805 is an identifier of the task corresponding to the task type 804. The task identifier 805 is the same as the task identifier 701. The connected node identifier 806 is an identifier of another task node connected to the task node corresponding to the task node identifier 801. The associated information 807 is information on the configuration required for the task node.

As shown in FIG. 8, a eigen value is not set for the task nodes. The reason for this is because even for identical operations systems, if the configuration of the computer systems from which those operations systems are built is different, or if the content of the tasks to be executed by the operations systems is different, the associations among the task nodes and the performance limits of the task nodes are also different.

Therefore, in this embodiment, the management server 100 is configured to calculate a weighting representing an importance level of the task nodes based on the configuration of the physical layer, the configuration of the logical layer, and the content of the tasks. The management server 100 is configured to specify the important nodes of the operations system based on the calculated weighting of the task nodes.

The important nodes have a high likelihood of having a large impact on the operations system. Therefore, measurement can be efficiently carried out by executing a stress test on the important nodes. Further, the performance limit of the operations system can also be estimated by grasping the behavior of the overall operations system with respect to the load of the important nodes. It should be noted that the stress test may be executed on task nodes other than the important nodes. For example, the stress test may be carried out on the task nodes connected to the important nodes.

This embodiment improves calculation efficiency and increases stress test accuracy by executing the stress test only on the important nodes.

In this embodiment, there is one node management table 323 for each operations system. An identifier of the operations system is associated with the node management table 323.

FIG. 9 is an explanatory diagram for illustrating an example of the threshold management table 324 of the first embodiment.

The threshold management table 324 stores a threshold to be used when the management server 100 specifies the important nodes. Specifically, the threshold management table 324 includes an identifier 901, a task identifier 902, and a threshold 903.

The identifier 901 is an identifier for uniquely identifying entries in the threshold management table 324. The task identifier 902 is an identifier for uniquely identifying tasks in the operations system. The task identifier 902 is the same as the task identifier 701. The threshold 903 is a threshold for a task.

In this embodiment, a threshold is set for each task. However, a single threshold may be set for the whole operations system.

FIG. 10 is an explanatory diagram for illustrating an example of the adjustment method management table 325 of the first embodiment.

The adjustment method management table 325 stores information on a method of adjusting the load on the physical nodes or the logical nodes in the stress test. Specifically, the adjustment method management table 325 includes an identifier 1001, a node type 1002, and an adjustment method 1003.

The identifier 1001 is an identifier for uniquely identifying entries in the adjustment method management table 325. The node type 1002 is the type of the node to be adjusted. In the node type 1002, "physical server", "SW", "VM", "vSW", and the like are stored.

The adjustment method 1003 includes information on the method of adjusting the load on the physical nodes or the logical nodes corresponding to the node type 1002. Specifically, the adjustment method 1003 includes an adjustment parameter type 1004, an adjustment value 1005, and a priority 1006.

The adjustment parameter type 1004 is the type of parameter (adjustment parameter) to be adjusted at the node corresponding to the node type 1002. The adjustment value 1005 is an adjustment value of the adjustment parameter. The priority 1006 is a priority order of the adjustment method. More specifically, in the priority 1006, a value is stored for determining the adjustment method to be employed when there are a plurality of entries having the same node type 1002 and adjustment parameter type 1004, but a different adjustment value 1005. In this embodiment, a smaller value indicates a higher priority order.

The content of the adjustment method is now described.

The entry indicated by "1" in the identifier 1001 has "VM" for the node type 1002, "CPU" for the adjustment parameter type 1004, and "−10%" for the adjustment value 1005. In this case, the management server 100 decreases the allocation ratio of the virtual processor allocated to the VM by "10%", and measures the impact on the overall operations system. The management server 100 subsequently decreases the allocation ratio of the virtual processor by "10%" step by step, and measures the impact on the overall operations system.

Further, the entry indicated by "5" in the identifier 1001 has "VM" for the node type 1002, "VM" for the adjustment parameter type 1004, and "−1" for the adjustment value 1005. In this case, the management server 100 decreases the number of VMs by "1", and measures the impact on the overall operations system. The management server 100 subsequently decreases the number of VMs by "1" step by step, and measures the impact on the overall operations system.

In addition, the entry indicated by "6" in the identifier 1001 has "VM" for the node type 1002, "CPU" for the adjustment parameter type 1004, and "vCPU−1 with reboot" for the adjustment value 1005. In this case, the management server 100 decreases the number of virtual processors for the VM by "1", reboots the system, and then measures the impact on the overall operations system. The management server 100 subsequently decreases the number of virtual processors by "1" step by step, reboots the system, and then measures the impact on the overall operations system.

It should be noted that when the load on the operations system changes suddenly, adjustment may be carried out in even more incremental steps.

FIG. 11 is an explanatory diagram for illustrating an example of the system performance table 326 of the first embodiment.

The system performance table 326 stores information on a performance characteristic function generated based on the measurement result of the stress test. Specifically, the system performance table 326 includes an identifier 1101, an important node identifier 1102, an associated node identifier 1103, and a performance characteristic function 1104.

The identifier 1101 is an identifier for uniquely identifying entries in the system performance table 326. In the system performance table 326, there is one entry for each important node. The important node identifier 1102 is an identifier of the task nodes that are important nodes. The associated node identifier 1103 is an identifier of the task nodes that are impacted by the important nodes. One or more associated nodes exist for each important node. In the following description, the task nodes impacted by the important nodes are also referred to as associated nodes.

The performance characteristic function 1104 stores information on a performance characteristic function representing a relationship between the important nodes and the associated nodes. Specifically, the performance characteristic function 1104 includes an adjustment parameter type 1105 and a function 1106.

The adjustment parameter type 1105 is an adjustment parameter of the important nodes, and corresponds to a variable of the performance characteristic function. The function 1106 stores the performance characteristic function. In this embodiment, the performance characteristic function is calculated as a change in the load of an associated node based on the adjustment parameter. The load of the associated node is the processor usage. It should be noted that memory usage, network usage, response time, and the like may also be used as the load of the associated node.

In this case, "X" stored in the function 1106 represents the value of the adjustment parameter corresponding to the adjustment parameter type 1105, and "Y" represents the load of the associated node.

In this embodiment, there is one system performance table 326 for each operations system. An identifier of the operations system is associated with the system performance table 326.

FIG. 12 is an explanatory diagram for showing an example of the weighting management table 327 of the first embodiment. FIG. 13 is an explanatory diagram for showing an example of a chart of the weighting management table 327 of the first embodiment in matrix form.

The weighting management table 327 stores information on the strength of the associations among the task nodes, which is calculated based on the measurement result of the stress test. Specifically, the weighting management table 327 includes an identifier 1201, a type 1202, a parameter type 1203, a task node identifier 1204, and a weighting 1205.

The identifier 1201 is an identifier for uniquely identifying entries in the weighting management table 327. The type 1202 is the type of object for which a weighting is to be calculated. In the case of an entry corresponding to the weighting of a node, "node" is stored in the type 1202. In the case of an entry corresponding to the weighting of an edge between two nodes, "edge" is stored in the type 1202. The parameter type 1203 stores the type of parameter for which one task node has an impact on another task node.

The task node identifier 1204 is an identifier of a task node associated with the type 1202. For example, when "node" is stored in the type 1202, the identifier of one task node is stored in the task node identifier 1204, and when "edge" is stored in the type 1202, the identifiers of the two task nodes connected by the edge are stored in the task node identifier 1204.

The weighting 1205 is the weighting of a task node or an edge. In this case, the weighting of a task node is the value for evaluating the importance level of the task node in the operations system. The weighting of an edge is the value for evaluating the strength of the association between the task nodes.

The weighting management table 327 shown in FIG. 12 can be represented as data in matrix form, such as that shown in FIG. 13. In this case, the diagonal components of the matrix correspond to the weighting of the nodes, and the off-diagonal components correspond to the weighting of the edges. For example, matrix component A11 corresponds to the weighting of the task node 1, and matrix component A12 corresponds to the weighting of the edge connecting the task node 1 and the task node 2.

There is a possibility that some matrix element entries are not present in the weighting management table 327. In this embodiment, when an entry corresponding to a matrix element is not present, the value for that matrix element is taken to be "0".

In this embodiment, there is one weighting management table 327 for each operations system. An identifier of the operations system is associated with the weighting management table 327.

FIG. 14 is an explanatory diagram for illustrating an example of the rule management table 328 of the first embodiment.

The rule management table 328 stores a method of changing the configuration of the operations system or computer system, and the change content. Specifically, the rule management table 328 includes a task identifier 1401, a UUID 1402, a task type 1403, associated information 1404, a priority order 1405, and a rule 1406.

The task identifier 1401 is an identifier for uniquely identifying tasks in the operations system. The task identifier 1401 is the same as the task identifier 701. The task type 1403 is the type of task to be executed by the task node. The task type 1403 is the same as the task type 804. The associated information 1404 is information on the configuration required for the task corresponding to the task type.

The priority order 1405 is a priority order of the tasks in the operations system. In this embodiment, a smaller value for the priority order 1405 indicates a higher priority order. The rule 1406 is the change content of the specific configuration of the operations system. In this embodiment, one or more pieces of change content are stored in the rule 1406. In this case, all of the pieces of change content may be applied, or the change content may be applied up to the point when performance of the operations system has improved.

Figure 15:
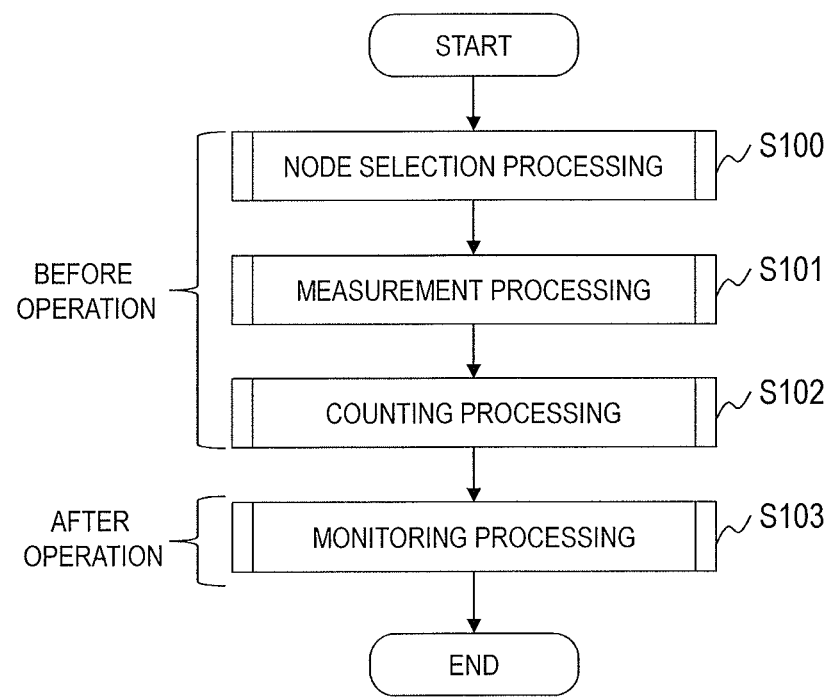
FIG. 15 is a flowchart for illustrating an outline of processing executed by the management server of the first embodiment.

FIG. 15 is a flowchart for illustrating an outline of processing executed by the management server 100 of the first embodiment.

The control module 201 of the management server 100 starts the processing when an instruction to execute a stress test is received from the user or the like. It should be noted that the trigger for the management server 100 to start the processing is not limited to this. For example, the management server 100 may execute the processing periodically, or may start the processing when a change to the operations system or computer system is detected. The identifier of the operations system on which processing is to be executed is input to the management server 100.

First, the control module 201 executes node selection processing (Step S100). In the node selection processing, the control module 201 analyzes the configuration of the computer system, and selects one or more important nodes from among the plurality of task nodes constructing the operations system based on the analysis result. Details of the node selection processing are described later with reference to FIG. 16.

The control module 201 then executes measurement processing (Step S101), and counting processing based on the result of the measurement processing (Step S102). In the measurement processing, a stress test focused on the important nodes selected in the node selection processing is executed. In the counting processing, based on the result of the measurement processing, information representing an association between two task nodes is generated. Details of the measurement processing are described later with reference to FIG. 17. Further, details of the counting processing are described later with reference to FIG. 19.

The processing from Step S100 to Step S102 is executed before operation of the operations system. After operation of the operations system has started, the control module 201 executes monitoring processing on the operations system based on the results of the measurement processing and the counting processing (Step S103). Details of the monitoring processing are described later with reference to FIG. 20.

Figure 16:
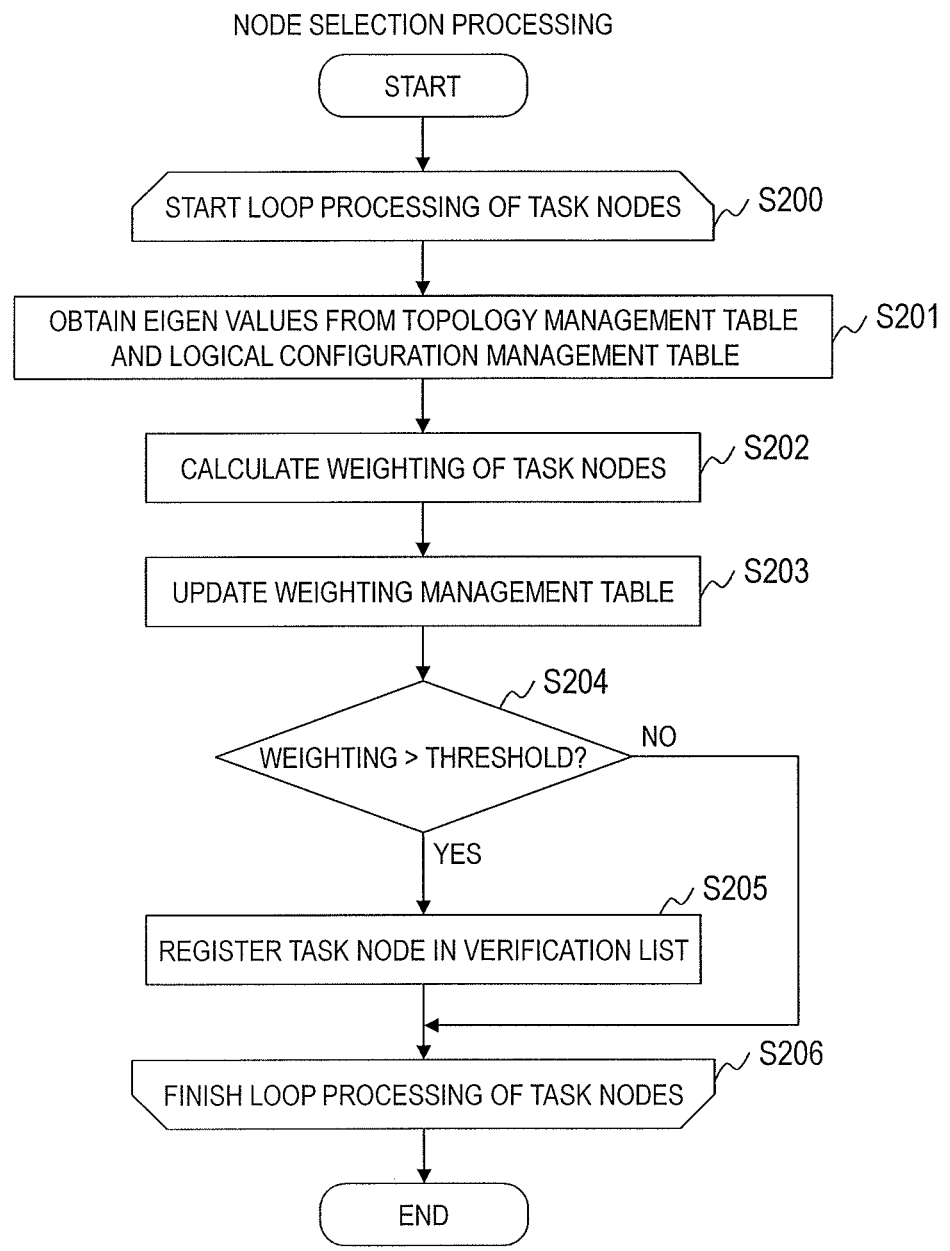
FIG. 16 is a flowchart for illustrating an example of node selection processing of the first embodiment.

FIG. 16 is a flowchart for illustrating an example of the node selection processing of the first embodiment. The weighting calculation module 310 included in the control module 201 executes the node selection processing.

The weighting calculation module 310 starts loop processing of the task nodes (Step S200). At this stage, the weighting calculation module 310 selects a task node to be processed from among the task nodes included in the operations system.

Specifically, the weighting calculation module 310 selects one entry by referring to the node management table 323 corresponding to the input identifier of the operations system. In this embodiment, the weighting calculation module 310 makes the selection in order of the entries from the top of the node management table 323. It should be noted that the priority order may be set in advance based on the task type or task content, and the weighting calculation module 310 may be configured to select the entry based on that priority order.

The weighting calculation module 310 obtains the eigen values associated with the selected task node from the topology management table 320 and the logical configuration management table 321 (Step S201). Specifically, processing such as the following is executed.

The weighting calculation module 310 refers to the assigned node identifier 803 of the entry selected from the node management table 323, and specifies a node providing computer resources to the selected task node.

When the node providing computer resources to the task node is a physical node, the weighting calculation module 310 refers to the topology management table 320, and retrieves all of the entries having a physical node identifier 503 that matches the assigned node identifier 803. The weighting calculation module 310 obtains the value of the eigen value 508 of all of the retrieved entries.

When the node providing computer resources to the task node is a logical node, the weighting calculation module 310 refers to the logical configuration management table 321, and retrieves the entries having a logical node identifier 603 that matches the assigned node identifier 803. The weighting calculation module 310 obtains the value included in the system configuration 608 and the value of the eigen value 610 of the retrieved entries.

In addition, the weighting calculation module 310 refers to the topology management table 320, and retrieves all of the entries having a physical node identifier 503 that matches the physical node identifier 607 of the entries retrieved from the logical configuration management table 321. The weighting calculation module 310 obtains the value of the eigen value 508 of all of the retrieved entries.

It should be noted that in this embodiment, the physical nodes such as the blade server 223 are handled as task nodes, but the physical nodes such as the NW-SW 250 are not handled as task nodes. In the task layer, the physical nodes such as the NW-SW 250 are handled as edges. As a result, when the weighting calculation module 310 calculates the eigen values, it is necessary to set in advance whether or not consideration needs to be given to the physical nodes such as the NW-SW 250. In this embodiment, the physical nodes that are taken into consideration when calculating the eigen values for the task nodes are set in advance. It should be noted that the eigen values of the physical nodes included in the edges may also be used as a weighting coefficient of the edges.

The above is a description of the processing carried out in Step S201.

Next, the weighting calculation module 310 calculates the weighting of each task node by using the eigen values obtained from the topology management table 320 and the logical configuration management table 321 (Step S202). Various methods of calculating the weighting of each task node may be employed. For example, a method such as the following calculation method may be employed.

When the node providing computer resources to the task node is a physical node, the weighting calculation module 310 calculates a first total value by adding together all of the values obtained from the eigen values 508 of the topology management table 320. This first total value is taken as the weighting of the task node.

When the node providing computer resources to the task node is a logical node, the weighting calculation module 310 calculates a first total value by adding together all of the values obtained from the eigen value 508 of the topology management table 320. Further, the weighting calculation module 310 calculates a second total value by adding together the values included in the system configuration 608 of the logical configuration management table 321 and the values of the eigen values 610. In addition, the weighting calculation module 310 calculates a third total value by adding together the first total value and the second total value. This third total value is taken as the weighting of the task node.

Further, a method using the second total value as the weighting coefficient may be employed. In this case, the weighting calculation module 310 calculates the weighting of the task node by multiplying the first total value by the second total value.

It should be noted that the method of calculating the weighting of the task node described above is one example. This embodiment is not limited regarding the method of calculating the weighting of the task nodes that is employed. Any method may be employed, as long as the method is capable of calculating an index (weighting) for evaluating the importance level of the task nodes based on the configuration of the physical layer and the configuration of the logical layer.

Next, the weighting calculation module 310 updates the weighting management table 327 based on the calculated weighting (Step S203).

Specifically, the weighting calculation module 310 adds an entry to the weighting management table 327, and sets a predetermined identifier in the identifier 1201 of the added entry. The weighting calculation module 310 sets "node" in the type 1202 of the added entry, and sets the identifier of the task node to be processed in the task node identifier 1204.

Further, the weighting calculation module 310 sets the calculated weighting in the weighting 1205. It should be noted that the parameter type 1203 remains blank.

The weighting calculation module 310 then determines whether or not the weighting of the task node is more than a threshold (Step S204).

Specifically, the weighting calculation module 310 refers to the threshold management table 324, and retrieves an entry having a task identifier 902 that matches the task identifier 805 of the entry selected from the node management table 323. The weighting calculation module 310 then determines whether or not the weighting of the task node is more than the value of the threshold 903 of the retrieved entry.

When the weighting of the task node is determined to be equal to or less than the value of the threshold 903, the weighting calculation module 310 proceeds the processing to Step S206.

When the weighting of the task node is determined to be more than the value of the threshold 903, the weighting calculation module 310 registers the selected task node in a verification list (Step S205). In this case, the verification list is a list in which the important nodes are registered.

Specifically, the weighting calculation module 310 registers the entry of the selected task node in the verification list. In this embodiment, the weighting calculation module 310 registers an entry having the same content as the entry corresponding to the task node of the logical configuration management table 321 in the verification list. Further, the weighting calculation module 310 sorts the entries stored in the verification list based on the weighting of the task node. In this embodiment, the weighting calculation module 310 rearranges the entries in descending order of the task node weighting.

It should be noted that when there is no verification list, the weighting calculation module 310 generates the verification list in a work area of the memory 302, and registers the entry for the task node in the generated verification list.

The weighting calculation module 310 then determines whether or not the processing of all of the task nodes in the operations system to be processed is complete (Step S206). When it is determined that the processing of all of the task nodes in the operations system to be processed is not complete, the processing returns to Step S200, and the weighting calculation module 310 executes the same processing on a new task node.

When it is determined that the processing of all of the task nodes in the operations system to be processed is complete, the weighting calculation module 310 finishes the processing.

Figure 17:
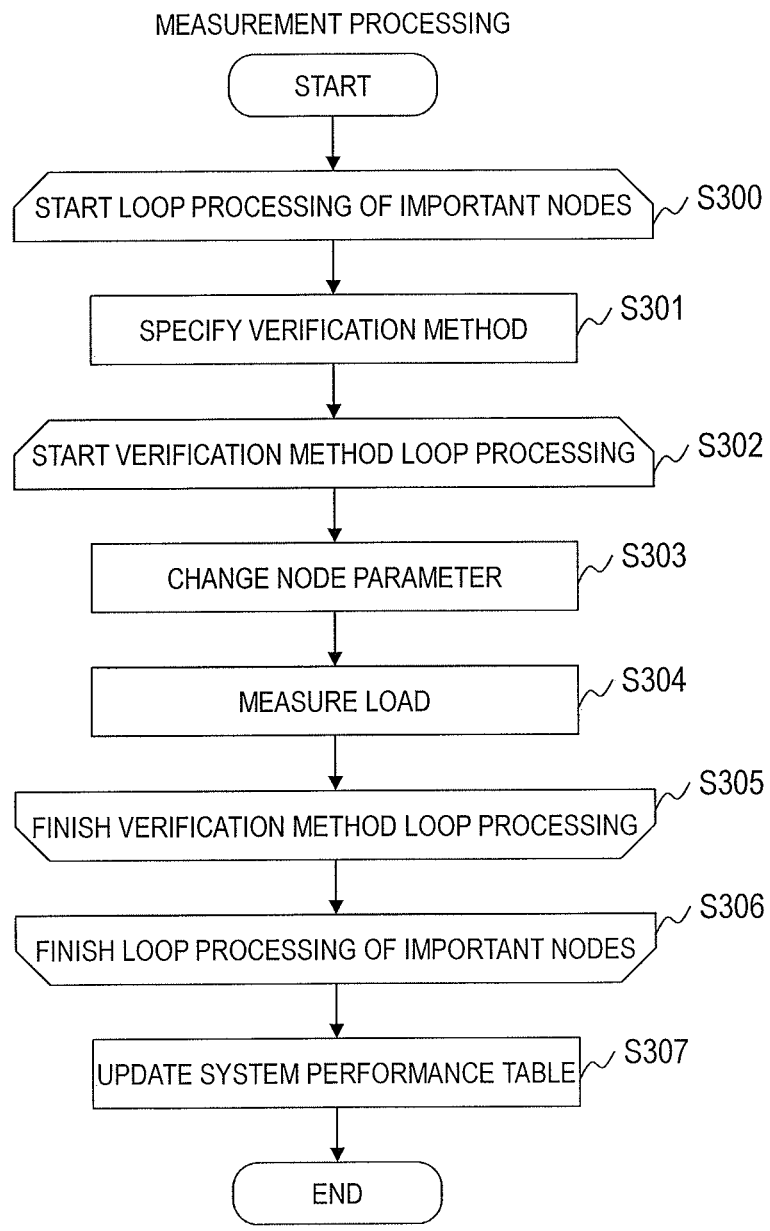
FIG. 17 is a flowchart for illustrating an example of measurement processing of the first embodiment.

FIG. 17 is a flowchart for illustrating an example of the measurement processing of the first embodiment. The measurement module 311 included in the control module 201 executes the measurement processing.

The measurement module 311 starts loop processing of the important nodes (Step S300). At this stage, the measurement module 311 selects one important node entry from the verification list. In this embodiment, the entries in the verification list are arranged in descending order of the weighting, and hence the measurement module 311 selects an entry in order from the top of the verification list. Further, the measurement module 311 adds an entry to the system performance table 326, sets a predetermined identifier in the identifier 1101, and sets the identifier of the selected important node in the important node identifier 1102.

The measurement module 311 refers to the adjustment method management table 325, and specifies the verification method to be applied to the selected important node (Step S301). Specifically, processing such as the following is executed.

The measurement module 311 obtains the identifier from the assigned node identifier 803 of the entry of the selected important node.

(1) When the obtained identifier is an identifier of a physical node, the measurement module 311 specifies the apparatus based on the physical node identifier. When the apparatus is a blade server 223, the measurement module 311 obtains all of the entries having "physical server" in the node type 1002 from the adjustment method management table 325. Further, when the apparatus is a switch, the measurement module 311 obtains all of the entries having "SW" in the node type 1002 from the adjustment method management table 325.

(2) When the obtained identifier is an identifier of a logical node, the measurement module 311 specifies the logical apparatus based on the logical node identifier. When the logical apparatus is a VM, the measurement module 311 obtains all of the entries having "VM" in the node type 1002 from the adjustment method management table 325. Further, when the logical apparatus is a virtual switch, the measurement module 311 obtains all of the entries having "vSW" in the node type 1002 from the adjustment method management table 325.

In addition, the measurement module 311 refers to the topology management table 320, specifies the physical node associated with the logical node, and by using the same method as the method described in (1), obtains all of the entries corresponding to the physical node from the adjustment method management table 325.

The above is a description of the processing carried out in Step S301.

Next, the measurement module 311 starts loop processing of the verification method (from Step S302 to Step S309). In the loop processing of the verification method, the measurement module 311 adjusts at least any one of the parameters of the physical node and logical node for each specified verification method, and measures the load on the overall operations system.

First, the measurement module 311 selects one of the specified verification methods, and starts measurement processing based on the selected verification method (Step S302). At this stage, when there are a plurality of entries having the same adjustment parameter type 1004 and adjustment value 1005, the measurement module 311 selects an entry based on the value of the priority 1006.

The measurement module 311 changes a parameter of the physical node or logical node based on the selected verification method (Step S303), and measures various loads in the operations system (Step S304).

The measurement method employed in this embodiment is not limited. For example, an experimental design method may be employed. In this embodiment, the load of each task node in the operations system is measured. For example, the measurement module 311 measures the processor usage, memory usage, network bandwidth usage, throughput, and the like of the task node as the load. In this case, as an example, the number of processed requests (throughput) at the task node is measured as the load.

Further, the measurement module 311 stores a measurement result 1800 in a work area of the memory 302, or in a storage area of the storage subsystem 260. An example of the measurement result 1800 is now described with reference to FIG. 18.

FIG. 18 is an explanatory diagram for illustrating an example of the measurement result 1800 of the first embodiment.

The measurement result 1800 shown in FIG. 18 has one entry for each entry in the verification list. In other words, the measurement result 1800 includes the same number of entries as important nodes. Each entry includes an important node identifier 1801, an adjustment parameter type 1802, a task node identifier 1803, a parameter value 1804, and a measurement value 1805.

The important node identifier 1801 is an identifier of the important node selected in Step S300. The identifier stored in the important node identifier 1801 is the same as the identifier stored in the task node identifier 801. The adjustment parameter type 1802 is the type of adjustment parameter adjusted in Step S303. The adjustment parameter type 1802 is the same as the adjustment parameter type 1004.

The task node identifier 1803 is an identifier of the task node on which load measurement was carried out. The task node identifier 1803 is the same as the task node identifier 801. The parameter value 1804 is a value of the parameter actually adjusted based on the verification method selected by the measurement module 311 in Step S302. The measurement value 1805 is a value representing the load of the task node corresponding to the task node identifier 1803 when the parameter has been adjusted to the value indicated in the parameter value 1804.

The description now returns to FIG. 17.

The measurement module 311 determines whether or not processing of all of the specified verification methods is complete (Step S305). When it is determined that processing of all of the specified verification methods is not complete, the processing returns to Step S302, and the measurement module 311 executes the same processing on a new verification method.

When it is determined that processing of all of the specified verification methods is complete, the measurement module 311 determines whether or not processing of all of the important nodes is complete, that is, whether or not processing of all of the entries included in the verification list is complete (Step S306). When it is determined that processing of all of the important nodes is not complete, the processing returns to Step S300, and the measurement module 311 executes the same processing on a new important node.

When it is determined that processing of all of the important nodes is complete, the measurement module 311 updates the system performance table 326 based on the measurement result 1800 (Step S307), and then finishes the processing. Specifically, processing such as the following is executed.

The measurement module 311 reads one entry from the measurement result 1800, and adds one entry to the system performance table 326. The measurement module 311 sets a predetermined identifier in the identifier 1101 of the added entry, and sets in the important node identifier 1102 the identifier stored in the important node identifier 1801.

The measurement module 311 selects one adjustment parameter type 1802, and specifies a task node having a load that has changed by a fixed value or more. For example, the measurement module 311 calculates the rate of change in the load by analyzing the measurement value 1805 corresponding to the task node identifier 1803, and determines whether or not the calculated rate of change in the load is 20% or more. A task node having a calculated rate of change in the load of 20% or more is specified as a task node having a load that has changed by a fixed value or more.

It should be noted that when a task node having an association with an important node is known in advance based on the result of a previous stress test and the like, that is, when the system performance table 326 used in a previous stress test is present in the memory 302, the measurement module 311 may select that task node.

The measurement module 311 sets the identifier of the task node specified by the above-mentioned processing in the task node identifier 1803 of the entry added to the system performance table 326. Further, the measurement module 311 sets information stored in the adjustment parameter type 1802 selected in the above-mentioned processing in the adjustment parameter type 1105 of that entry.

The measurement module 311 calculates the performance characteristic function based on an analysis result of the above-mentioned processing. In this case, the measurement module 311 calculates the performance characteristic function based on the value of the adjustment parameter corresponding to the adjustment parameter type 1105 as the domain (X) and the throughput as the range (Y). The measurement module 311 sets the calculated function in the function 1106. Then, the system performance table 326 is updated based on the same procedure.

The above is a description of the processing carried out in Step S307.

Figure 19:
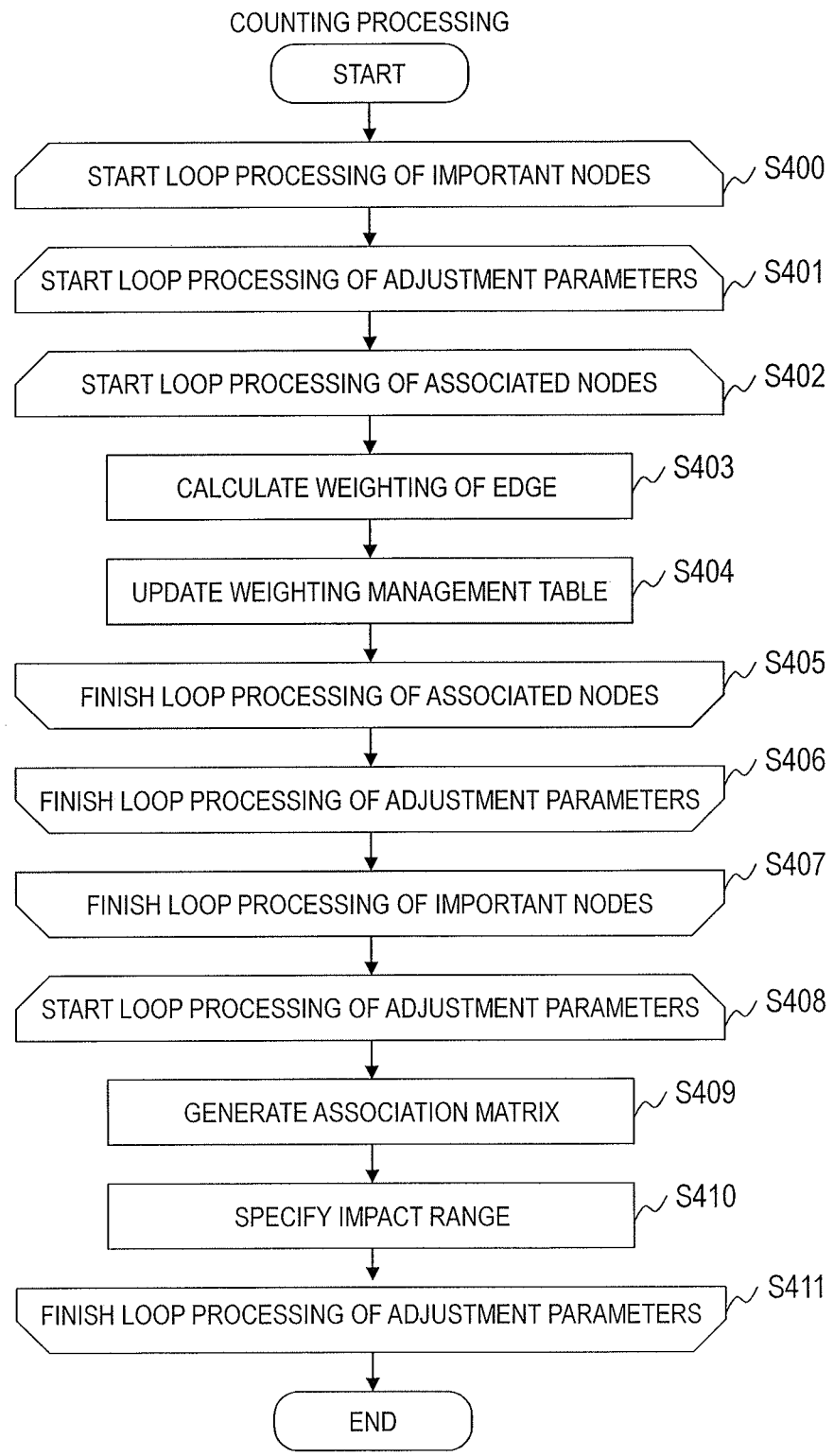
FIG. 19 is a flowchart for illustrating an example of counting processing of the first embodiment.

FIG. 19 is a flowchart for illustrating an example of the counting processing of the first embodiment. The estimation module 312 included in the control module 201 executes the counting processing.

First, the estimation module 312 starts loop processing of the important nodes (Step S400). At this stage, the estimation module 312 selects one entry from the system performance table 326. In the following description, the selected entry is also referred to as an important node entry.

Next, the estimation module 312 starts loop processing of the adjustment parameters (Step S401). Specifically, the estimation module 312 extracts all of the types of adjustment parameters from the adjustment parameter type 1105 of the important node entry, and selects one adjustment parameter to be processed from among the extracted adjustment parameters.

Next, the estimation module 312 starts loop processing of the task nodes (Step S402). Specifically, processing such as the following is executed.

The estimation module 312 extracts the associated node identifier from the task node identifier 1803 of the row including the selected adjustment parameter in the adjustment parameter type 1105 of the important node entry. The estimation module 312 selects one associated node identifier from among the extracted task node identifiers.

The estimation module 312 refers to the node management table 323 and specifies another task node that is connected to the selected task node. The estimation module 312 calculates the number of task nodes passed through from the important node until the selected task node as a first hop count. Further, the estimation module 312 calculates the number of task nodes passed through from the important node until the specified task node as a second hop count.

The estimation module 312 determines whether or not the first hop count is larger than the second hop count. When the first hop count is equal to or less than the second hop count, the estimation module 312 proceeds the processing to Step S403. When the first hop count is larger than the second hop count, the estimation module 312 proceeds the processing to Step S405. The above is a description of the processing carried out in Step S402.

The estimation module 312 calculates the weighting of the edge connecting two task nodes (Step S403). Various methods may be employed as the method of calculating the weighting of the edge. For example, a method such as the following may be used.

The estimation module 312 obtains the performance characteristic function from the function 1106 of the row matching the important node, associated node, and adjustment parameter selected in Step S400 to Step S402. The estimation module 312 calculates, as the weighting of the edge, a maximum value of the derivative of the performance characteristic function based on the performance characteristic function and the domain of the variable X.

It should be noted that, depending on the type of performance characteristic function, there may be cases in which the derivative cannot be calculated. In that case, a method can be employed that uses, instead of the derivative, the average value, the total value, or the like of the size of the load of the associated nodes resulting from a change in the adjustment parameter. In this case, the estimation module 312 refers to the measurement result 1800, and obtains the required values from the measurement value 1805 matching the identifiers of the important node, the task node, and the adjustment parameter. The above is a description of the processing carried out in Step S403.

The estimation module 312 updates the weighting management table 327 based on the calculated edge weighting (Step S404).

Specifically, the estimation module 312 adds an entry to the weighting management table 327, and sets a predetermined identifier in the identifier 1201 of the added entry. The estimation module 312 sets "edge" in the type 1202 of the added entry, and sets the selected adjustment parameter in the parameter type 1203. Further, the estimation module 312 sets the identifiers of the selected task node and the specified task node in the task node identifier 1204, and sets the calculated edge weighting in the weighting 1205. It should be noted that when a plurality of task nodes are connected to the selected task node, a plurality of entries are added to the weighting management table 327.

The estimation module 312 determines whether or not processing of all of the associated nodes is complete (Step S405). When it is determined that processing of all of the associated nodes is not complete, the processing returns to Step S402, and the estimation module 312 executes the same processing on a new associated node.

When it is determined that processing of all of the associated nodes is complete, the estimation module 312 determines whether or not processing of all of the adjustment parameters is complete (Step S406). When it is determined that processing of all of the adjustment parameters is not complete, the processing returns to Step S401, and the estimation module 312 selects a new adjustment parameter and executes the same processing.

When it is determined that processing of all of the adjustment parameters is complete, the estimation module 312 determines whether or not processing of all of the important nodes is complete (Step S407). When it is determined that processing of all of the important nodes is not complete, the processing returns to Step S400, and the estimation module 312 executes the same processing on a new important node. On the other hand, when it is determined that processing of all of the important nodes is complete, the estimation module 312 proceeds the processing to Step S408.

In the processing from Step S408 onwards, the estimation module 312 generates a matrix representing the strength of the associations among the plurality of task nodes based on the weighting management table 327. In the following description, the matrix representing the strength of the associations among the plurality of task nodes is also referred to as an association matrix. In this embodiment, an edge weighting is calculated for each adjustment parameter, and hence the estimation module 312 generates an association matrix for each adjustment parameter.

The estimation module 312 selects the adjustment parameter to be processed (Step S408). Specifically, the estimation module 312 extracts all the types of adjustment parameters stored in the parameter type 1203 of the weighting management table 327, and selects the adjustment parameter to be processed from among the extracted adjustment parameters.

The estimation module 312 generates the association matrix for the selected adjustment parameter (Step S409). Specifically, processing such as the following is executed.

The estimation module 312 generates a matrix having n-rows and n-columns. In this case, "n" represents the number of task nodes, which matches the number of task nodes registered in the weighting management table 327. At this stage, all of the values of the matrix elements are set to "0".

In this embodiment, the identifier of the task node corresponds to the row and column of the matrix. For example, "task node 1" corresponds to row 1, column 1. In this case, the matrix component at row 1, column 1, represents the strength of the association of the "task node 1" itself. The matrix component at row 1, column n, or row n, column 1, represents the strength of the association between the "task node 1" and another task node.

The estimation module 312 refers to the weighting management table 327, and sets the value stored in the weighting 1205 of the entry having "node" in the type 1202 as the diagonal components of the matrix. In this embodiment, the diagonal components of the matrix components do not depend on the adjustment parameter.

The estimation module 312 refers to the weighting management table 327, and retrieves an entry having "edge" stored in the type 1202 and the selected adjustment parameter stored in the parameter type 1203. Further, the estimation module 312 sets the value stored in the weighting 1205 as the off-diagonal components of the matrix based on the task node identifier 1204 of the retrieved entry.

According to the above-mentioned processing, an association matrix such as that shown in FIG. 13 can be generated from the weighting management table 327.

The above is a description of the processing carried out in Step S409.

Next, the estimation module 312 specifies the impact range in the operations system based on the generated association matrix (Step S410).

Specifically, the estimation module 312 specifies a matrix component in which a value larger than a predetermined threshold is set. The estimation module 312 can specify the impact range of the operations system caused by fluctuations in the load of the important nodes based on an estimated matrix component. The estimation module 312 stores impact range data in which the identifier of the important node, the adjustment parameter, and the specified matrix component are associated with one another in a work area of the memory 302.

When the management server 100 receives an instruction from the user to display the impact range, the management server 100 displays an operations system such as that illustrated in FIG. 1 based on the node management table 323 and the association matrix. Further, based on the impact range data, the management server 100 can display an impact range such as that illustrated in FIG. 1.

It should be noted that the instruction from the user includes at least any one of the identifier of the important node and the adjustment parameter.

The above is a description of the processing carried out in Step S410.

Next, the estimation module 312 determines whether or not processing of all of the adjustment parameters is complete (Step S411). When it is determined that processing of all of the adjustment parameters is not complete, the processing returns to Step S408, and the estimation module 312 executes the same processing on a new adjustment parameter.

When it is determined that processing of all of the adjustment parameters is complete, the estimation module 312 finishes the processing.

Figure 20:
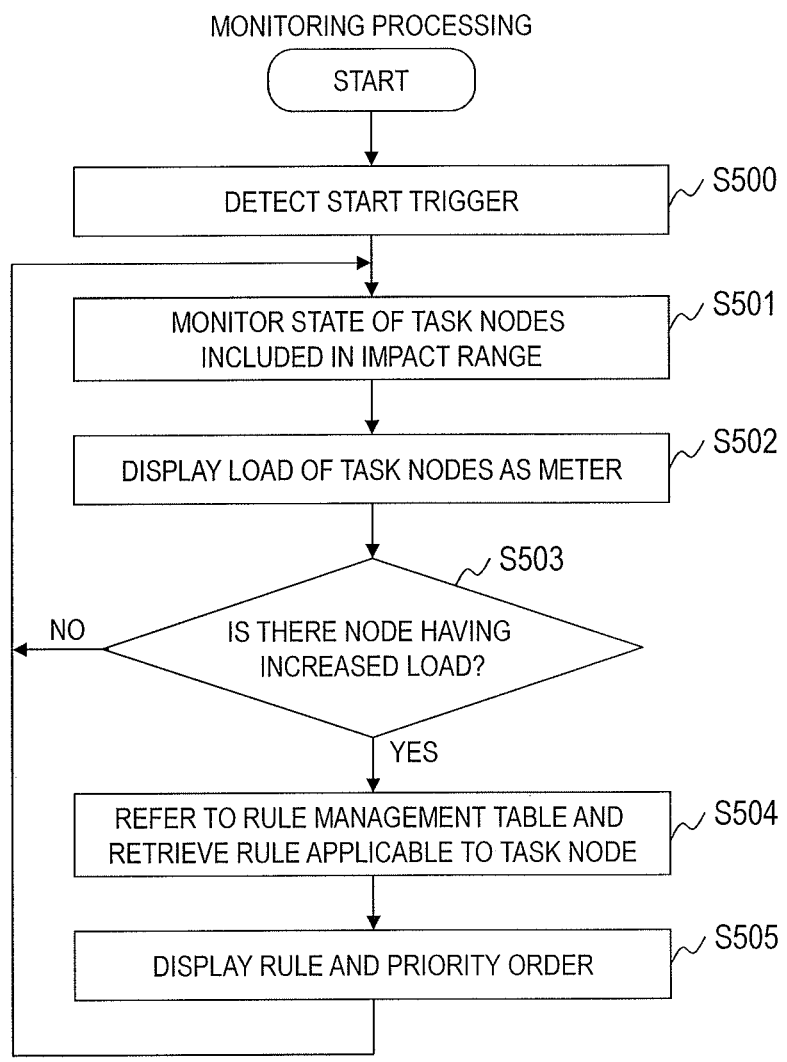
FIG. 20 is a flowchart for illustrating an example of monitoring processing of the first embodiment.

FIG. 20 is a flowchart for illustrating an example of the monitoring processing of the first embodiment. The operations system monitoring module 313 included in the control module 201 executes the monitoring processing.

The monitoring processing starts when the operations system monitoring module 313 detects a processing start trigger (Step S500). For example, when the monitoring processing is executed periodically, the operations system monitoring module 313 starts the monitoring processing when detecting a lapse of a fixed period of time. Further, the operations system monitoring module 313 starts the monitoring processing when an instruction is received from the user.

The operations system monitoring module 313 reads the system performance table 326 and the impact range data, and monitors the state of the task nodes included in the impact range in the operations system based on the read information (Step S501).

It should be noted that various methods may be employed as the method of monitoring the load. For example, the operations system monitoring module 313 may obtain the state of the task nodes each time a predetermined time interval elapses. Further, in this embodiment, the state of the task nodes included in the impact range is monitored. However, only the state of the important nodes may be monitored. In addition, the monitoring may be carried out on only a specific parameter, or on all parameters.

The operations system monitoring module 313 displays the loads of the task nodes included in the impact range as a meter representing a load ratio (Step S502). In other words, a critical level representing the possibility of the computer resources allocated to the task nodes being insufficient is displayed as a meter. Specifically, processing such as the following is executed.

The operations system monitoring module 313 refers to the system performance table 326, and retrieves an entry matching the identifier of an important node included in the impact range data. Next, the operations system monitoring module 313 obtains the performance characteristic function from the function 1106 of a row having an identifier stored in the associated node identifier 1103 that matches the identifier of the task node for which a load has been obtained, and an adjustment parameter type 1105 that matches the parameter corresponding to the obtained load.

The operations system monitoring module 313 calculates the current load ratio with respect to the maximum load based on the performance characteristic function and the value of the obtained load of the task node. It should be noted that the maximum load can be calculated based on the domain X and the performance characteristic function.

The operations system monitoring module 313 displays a meter 15 such as that illustrated in FIG. 1 based on the calculated load ratio. The above is a description of the processing carried out in Step S502.

Next, the operations system monitoring module 313 determines whether or not there is a task node having an increased load (Step S503).

Specifically, the operations system monitoring module 313 determines whether or not there is a task node having a load ratio calculated in Step S502 that is larger than a predetermined threshold. For example, the operations system monitoring module 313 determines whether or not there is a task node having a load ratio larger than 80%.

Further, the operations system monitoring module 313 may determine that there is a task node having an increased load when an instruction to change the configuration of the task nodes has been received from the user who has seen the display of the meter 15.

When it is determined that there are no task nodes having an increased load, the processing returns to Step S501, and the operations system monitoring module 313 continues to monitor the state of the operations system.

When it is determined that there is a task node having an increased load, the operations system monitoring module 313 refers to the rule management table 328, and retrieves a rule that is applicable to the task node (Step S504). Specifically, processing such as the following is executed.

The operations system monitoring module 313 refers to the node management table 323, and retrieves an entry having an identifier of the task node identifier 801 that matches the identifier of the task node specified in Step S504. The operations system monitoring module 313 obtains the values stored in the task type 804 and the task identifier 805 of the retrieved entry.

The operations system monitoring module 313 refers to the rule management table 328, and retrieves an entry having a task identifier 1401 that matches the value obtained from the task identifier 805 and a task type 1403 that matches the value obtained from the task type 804.

The above is a description of the processing carried out in Step S504. It should be noted that when there are a plurality of task nodes having an increased load, the operations system monitoring module 313 executes the above-mentioned processing on each of those task nodes.

Next, the operations system monitoring module 313 displays the rule retrieved from the rule management table 328 along with an alert (Step S505). Then, the processing returns to Step S501, and the operations system monitoring module 313 continues to monitor the operations system.

Specifically, the operations system monitoring module 313 displays to the user the content stored in the rule 1406 and the numeral value set in the priority order 1405 of the entry retrieved from the rule management table 328. As a result, the user can grasp the fact that improvement to the performance of the operations system is necessary, and grasp the change content for improving the performance of the operations system, without needing to grasp the detailed state of the configuration of the physical layer and logical layer.

It should be noted that in this embodiment, the operations system monitoring module 313 only displays the rule. However, processing for changing the configuration of the operations system may be executed based on the rule. Further, the rule may be displayed along with cost information, such as the cost when the rule is applied and a service suspension time.

It should be noted that this embodiment is described based on an example of a system having a three-layer configuration, namely, a physical layer, a logical layer, and a task layer. However, this embodiment is not limited to such a configuration. This embodiment may also be applied in a system having a two-layer configuration consisting of a physical layer and a task layer. In other words, this embodiment may be applied even in a system in which a physical node is assigned to every task node.

It should also be noted that the logical layer may have a multi-level structure. For example, the logical layer may have a two-level structure in which a plurality of logical computers are built by logically partitioning a blade server 223, and a plurality of virtual computers are made to run on each of the logical computers.

According to the first embodiment, the management server 100 can estimate the performance limit of the operations system by specifying important task nodes based on configuration information on the physical layer and logical layer, and executing a stress test on the important task nodes. An example of a method of applying the first embodiment is described below.

The performance limit of a computer system for a specific operations system can be estimated by building the specific operations system on the computer system, and executing node selection processing, measurement processing, and counting processing by the management server 100.

As a result, the provider operating the computer system can estimate the computer resources required to build the specific operations system, and can design a computer system specifically adapted to the specific operations system.

Further, the execution of the monitoring processing by the management server 100 enables the management costs of the user operating the operations system to be reduced.

Modified Example

In the node selection processing, the weighting calculation module 310 only calculates the weighting of the selected task node. However, the weighting calculation module 310 may also calculate the weighting of an edge connecting the selected task node and another task node.

An example is described below of a case in which the logical node assigned to a selected task node (first task node) forms a cluster with another logical node of the same physical server, and a task node (second task node) assigned to the another logical node exists.

In Step S201, the weighting calculation module 310 refers to the topology management table 320 and the logical configuration management table 321, and determines whether or not there is a special connection relationship between the selected task node and the another task node based on the identifiers stored in the task node identifier 801 and the connected node identifier 806 of the entry corresponding to the selected task node.

When it is determined that there is a special connection relationship, in Step S202, the weighting calculation module 310 calculates the eigen value stored in the system configuration 608 as the weighting of the edge connecting the first task node and the second task node.

In Step S203, the weighting calculation module 310 registers the calculated edge weighting in the weighting management table 327. Specifically, processing such as the following is executed.

The weighting calculation module 310 adds an entry to the weighting management table 327, and sets a predetermined identifier in the identifier 1201 of the added entry. The weighting calculation module 310 sets "edge" in the type 1202 of the added entry, and sets the identifier of the first task node and the identifier of the second task node in the task node identifier 1204. It should be noted that the parameter type 1203 remains blank.

Further, the weighting calculation module 310 sets a conversion formula that uses the calculated edge weighting as a weighting coefficient in the weighting 1205 of the added entry. A conversion formula such as the weighting 1205 of the entry having "102" in the identifier 1201 of FIG. 12 is set. In this case, "0.8" is the weighting coefficient, and "m" is the weighting of the edge determined based on the measurement result. At this point, the edge weighting is unknown, and hence the edge weighting is set as a variable. It should be noted that the conversion formula is not limited to a conversion formula such as that shown in FIG. 12. For example, a conversion formula involving addition, division, and the like may also be employed.

The remaining processing is the same as the processing in the first embodiment, and hence a description thereof is omitted here. It should be noted that the same processing may be applied on the physical nodes.

In the counting processing, in Step S404, the estimation module 312 calculates a corrected edge weighting by substituting the calculated edge weighting into the conversion formula stored in the weighting 1205, and overwrites the weighting in the weighting 1205 with the calculated edge weighting.

Thus, with the use of a weighting coefficient, a measurement result that better reflects the configuration of the physical layer and logical layer can be obtained.

Second Embodiment

In the measurement processing of the first embodiment, the management server 100 measures the load of the task nodes for all of the verification methods. However, there are cases in which the adjustment parameter is obvious in advance, or in which faster measurement processing is necessary. In a second embodiment of this invention, the user designates the adjustment parameter in advance. The second embodiment is described while focusing on the differences from the first embodiment.

The system configuration, the configuration of the management server 100, and the configuration of the blade servers 223 in the second embodiment are the same as in the first embodiment, and hence a description thereof is omitted here. Further, the content of the management table group 202 in the management server 100 in the second embodiment is also the same as in the first embodiment, and hence a description thereof is omitted here. In addition, the node selection processing, the counting processing, and the monitoring processing in the second embodiment are the same as in the first embodiment, and hence a description thereof is omitted here.

In the second embodiment, a part of the processing content of the measurement processing is different. Specifically, the measurement module 311 displays to the user an orientation parameter registration screen 2100 for designating the verification method to be applied when starting the measurement processing. The orientation parameter registration screen 2100 is now described.

Figure 21:
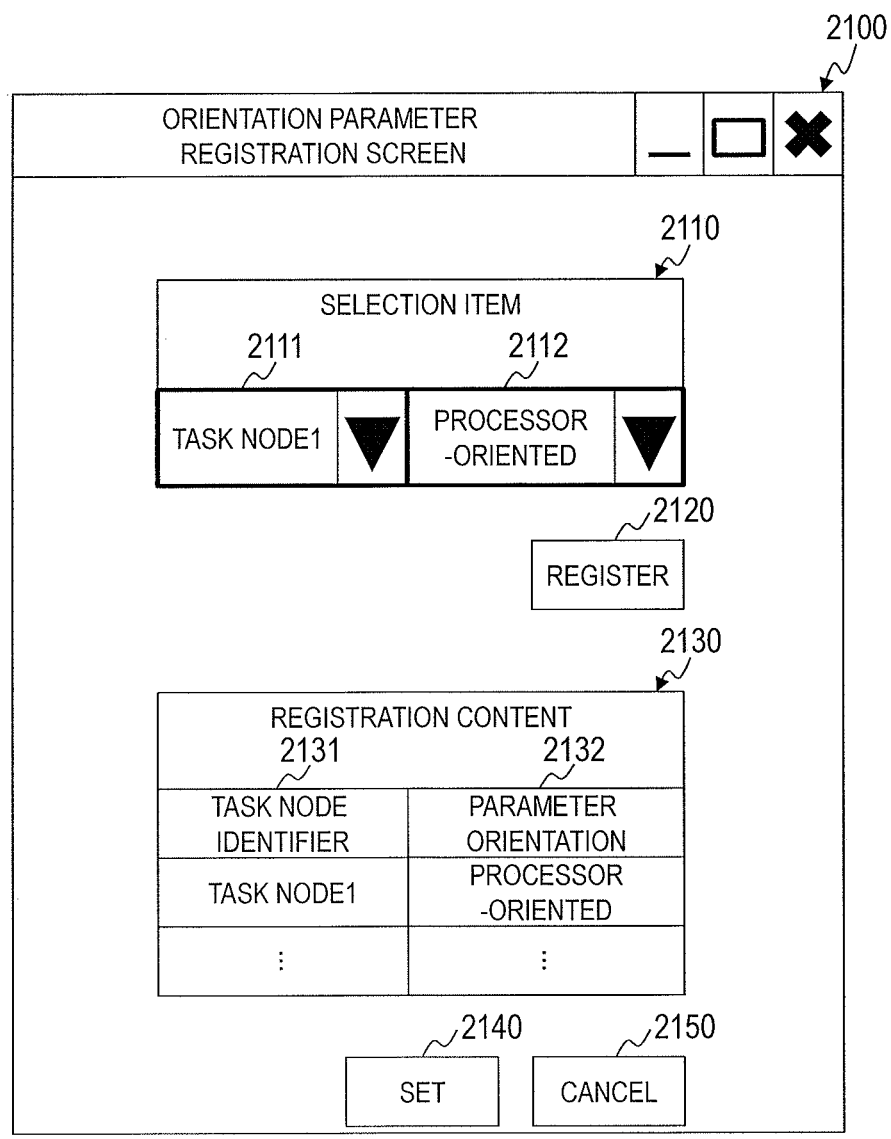
FIG. 21 is an explanatory diagram for illustrating an example of an orientation parameter registration screen of a second embodiment.

FIG. 21 is an explanatory diagram for illustrating an example of the orientation parameter registration screen 2100 of the second embodiment.

A selection item display area 2110, a register button 2120, a registration content display area 2130, a setting button 2140, and a cancel button 2150 are displayed on the orientation parameter registration screen 2100.

The selection item display area 2110 is an area for displaying information for designating the adjustment parameter. The selection item display area 2110 includes a task node selection item 2111 and a parameter orientation selection item 2112.

The task node selection item 2111 is an item for selecting an important node. The parameter orientation direction selection item 2112 is an item for designating the adjustment parameter to be applied on the important node. The measurement module 311 displays the important node in the task node selection item 2111 based on the verification list. The parameter orientation selection item 2112 displays an adjustment parameter condition, the type of the adjustment parameter, or the like, rather than displaying the adjustment parameter itself. For example, "processor-oriented" or the like is displayed as a display for designating the adjustment parameter associated with the processor.

In the example illustrated in FIG. 21, the task node selection item 2111 and the parameter orientation selection item 2112 are displayed as pull-down menus.

The register button 2120 is an operation button for registering the operation content of the selection item display area 2110. When the user presses the register button 2120, the content set in the selection item display area 2110 is displayed in the registration content display area 2130.

The registration content display area 2130 is an area for displaying the setting content of the selection item display area 2110. The registration content display area 2130 includes a task node identifier 2131 and a parameter orientation 2132.

The task node identifier 2131 is the identifier of the important node. The parameter orientation 2132 is the parameter orientation to be applied on the important node.

The setting button 2140 is an operation button for reflecting the content displayed in the registration content display area 2130 in the measurement processing. When the user presses the setting button 2140, the measurement module 311 starts the processing of Step S300. The cancel button 2150 is an operation button for cancelling the content displayed in the registration content display area 2130.

When the setting button 2140 is pressed, the measurement module 311 temporarily stores the content displayed in the registration content display area 2130 in a work area of the memory 302. Further, the measurement module 311 specifies the method of verifying the selected important node based on the content set by using the orientation parameter registration screen 2100 (Step S301).

For example, when "processor-oriented" is designated for the selected important node, the measurement module 311 retrieves only the verification methods having an adjustment parameter type 1004 that is associated with the processor from among the verification methods registered in the adjustment method management table 325. The remaining processing is the same as in the first embodiment, and hence a description thereof is omitted here.

According to the second embodiment, the management server 100 is capable of executing a stress test for only the necessary adjustment parameters. As a result, the load of the measurement processing can be reduced, and the speed of the measurement processing can be increased.

Third Embodiment

In a third embodiment of this invention, in the node selection processing, the management server 100 selects the important nodes by using the configuration of the task layer in addition to using the configuration of the physical layer and logical layer. The third embodiment is described while focusing on the differences from the first embodiment.

The system configuration, the configuration of the management server 100, and the configuration of the blade servers 223 in the third embodiment are the same as in the first embodiment, and hence a description thereof is omitted here. The content of the management table group 202 in the management server 100 in the third embodiment is also the same as in the first embodiment, and hence a description thereof is omitted here. In addition, the measurement processing, counting processing, and monitoring processing are the same as in the first embodiment, and hence a description thereof is omitted here. In the third embodiment, a part of the node selection processing is different from the first embodiment.

After selection of the task node (Step S200), the weighting calculation module 310 obtains the weighting associated with the selected task node from the topology management table 320, the logical configuration management table 321, and the task management table 322 (Step S201).

The method of obtaining the eigen values from the topology management table 320 and the logical configuration management table 321 is the same as in the first embodiment, and hence a description thereof is omitted here. In this case, a method in which the weighting calculation module 310 obtains the eigen value of the task node from the task management table 322 is described. The weighting calculation module 310 refers to the task management table 322, and retrieves an entry having a task identifier 701 that matches the task identifier 805 of the entry selected from the node management table 323. The weighting calculation module 310 obtains the value of the eigen value 706 of the retrieved entry.

In Step S202, the weighting calculation module 310 calculates the weighting of the task node by using the eigen values obtained from the topology management table 320, the logical configuration management table 321, and the task management table 322. The remaining processing is the same as in the first embodiment, and hence a description thereof is omitted here.

According to the third embodiment, the selection of the important nodes can be performed while also considering information on the task layer, and hence a more accurate performance limit of the operations system can be estimated. An example of a method of providing the third embodiment is described below.

The performance limit of the operations system with respect to a known computer system can be estimated by building a new operations system on a known computer system, and executing node selection processing, measurement processing, and counting processing by the management server 100.

As a result, the user operating the operations system can grasp the computer resources required for the operations system, the configuration to be adjusted, the setting items to be adjusted, and the like.

Further, the execution of the monitoring processing by the management server 100 enables the management costs of the user operating the operations system to be reduced.

Fourth Embodiment

In a fourth embodiment of this invention, the management server 100 reflects the configuration of the task layer in an association matrix in the counting processing.

The system configuration, the configuration of the management server 100, and the configuration of the blade servers 223 in the fourth embodiment are the same as in the first embodiment, and hence a description thereof is omitted here. Further, the content of the management table group 202 in the management server 100 in the fourth embodiment is also the same as in the first embodiment, and hence a description thereof is omitted here. The node selection processing, counting processing, and monitoring processing in the fourth embodiment are the same as in the first embodiment, and hence a description thereof is omitted here. In the fourth embodiment, a part of the counting processing is different from the first embodiment.

The processing from Step S400 to Step S407 is the same as in the first embodiment.

After the estimation module 312 has selected the adjustment parameter to be processed (Step S408), the estimation module 312 generates an association matrix (Step S409). Specifically, processing such as the following is executed.

First, the estimation module 312 generates an association matrix based on the weighting management table 327 in accordance with the same procedure as in the first embodiment. Next, the estimation module 312 generates a superposition matrix based on configuration information on the task layer. The estimation module 312 reflects the superposition matrix in the association matrix. For example, the estimation module 312 multiplies, or, adds the superposition matrix to the association matrix.

In Step S410, the estimation module 312 specifies an impact range based on the association matrix in which the superposition matrix is reflected.

Figure 22:
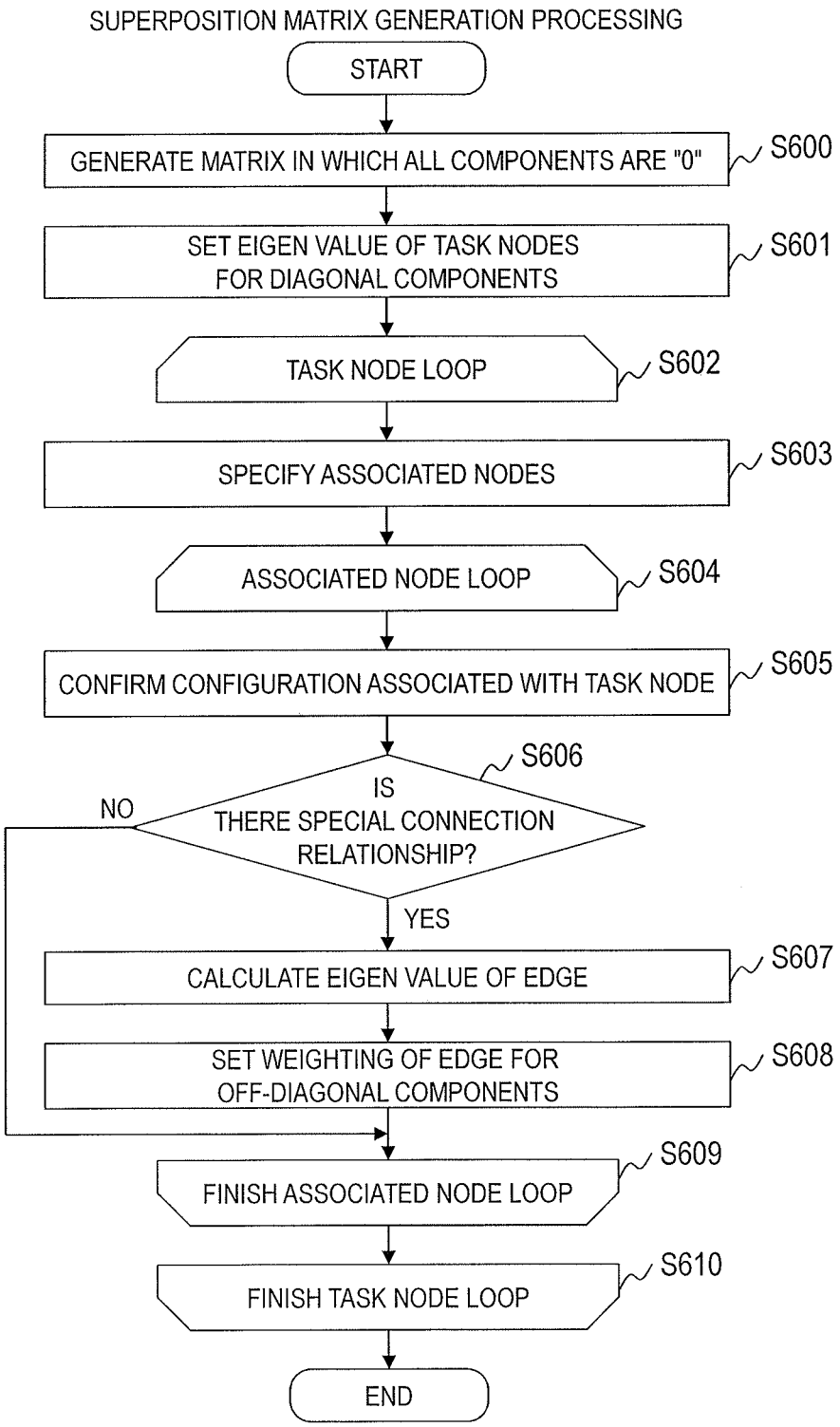
FIG. 22 is a flowchart for illustrating an example of processing for generating a superposition matrix of a fourth embodiment.

In this case, an example of the processing for generating the superposition matrix is described with reference to FIG. 22. FIG. 22 is a flowchart for illustrating an example of the processing for generating the superposition matrix of the fourth embodiment.

The estimation module 312 generates a matrix having n-rows and n-columns in which all of the matrix components are "0" (Step S600). The estimation module 312 sets the eigen value of the task node for the diagonal components (Step S601).

Specifically, the estimation module 312 selects one entry from the node management table 323, and obtains the value of the task identifier 805 of the selected entry. The estimation module 312 refers to the task management table 322, and retrieves an entry having a task identifier 701 that matches the value obtained from the task identifier 805. The estimation module 312 obtains the value of the eigen value 706 of the retrieved entry, and sets the value of the eigen value 706 for the diagonal components of the matrix corresponding to the selected task node.

The estimation module 312 executes the above-mentioned processing on all of the entries in the node management table 323, that is, on all of the task nodes. As a result, the values for the diagonal components of the matrix are set.

Next, the estimation module 312 starts loop processing of the task nodes (Step S602). At this stage, the estimation module 312 selects one entry from the node management table 323.

The estimation module 312 specifies the associated nodes connected to the task node corresponding to the selected entry (Step S603). Specifically, the estimation module 312 obtains the identifier of the task node from the connected node identifier 806 of the selected entry. In the following description, the task node corresponding to the connected node identifier 806 is also referred to as a connected node.

The estimation module 312 starts loop processing of the specified connected nodes (Step S604). At this stage, the estimation module 312 selects one identifier of the connected node to be processed from among the obtained identifiers of the connected nodes.

The estimation module 312 confirms the configuration associated with the task node and connected node (Step S605), and determines whether or not there is a special connection relationship between the task node and the connected node (Step S606). Specifically, processing such as the following is executed.

First, the estimation module 312 confirms the configuration of the task node. The estimation module 312 refers to the entry corresponding to the task node in the node management table 323, obtains the value of the assigned node identifier 803 and the value of the task identifier 805, and obtains information on the associated information 807.

The estimation module 312 refers to the task management table 322, and retrieves the entry having a value of the task identifier 701 that matches the value obtained from the task identifier 805. The estimation module 312 obtains the eigen value 706 of the retrieved entry.

The estimation module 312 specifies the node assigned to the task node based on the value obtained from the assigned node identifier 803.

When a physical node is assigned for the task node, the estimation module 312 refers to the topology management table 320, and retrieves the entry having a value of the physical node identifier 503 that matches the value of the assigned node identifier. The estimation module 312 obtains information from the reliability type 507 of the retrieved entry, and obtains the value from the eigen value 508.

When a logical node is assigned for the task node, the estimation module 312 refers to the logical configuration management table 321, and retrieves the entry having a value of the logical node identifier 603 that matches the value of the assigned node identifier. The estimation module 312 obtains information from the system configuration 608 of the retrieved entry, and obtains the value from the eigen value 610. Further, based on the value of the physical node identifier 607 of the retrieved entry, the estimation module 312 refers to the topology management table 320, obtains information from the reliability type 507 of the entry corresponding to the physical node, and obtains the value from the eigen value 508.

The same processing is also carried out on the configuration of the connected node.

The estimation module 312 analyzes the configuration of the task node and connected node, and determines whether or not there is a special connection relationship. For example, when the task node and the connected node are each logical nodes created on the same physical server and forming a cluster, the estimation module 312 determines that there is a special connection relationship.

The above is a description of the processing carried out in Step S605 and Step S606.

When it is determined that there is not a special connection relationship between the task node and the connected node, the estimation module 312 proceeds the processing to Step S609.

When it is determined that there is a special connection relationship between the task node and the connected node, the estimation module 312 calculates the eigen value of the edge by using the eigen value obtained in Step S605 (Step S607). Various methods of calculating the eigen value of the edge may be employed. For example, the eigen value of the edge may be calculated by adding together the value of the eigen value 610 associated with the task node and the value of the eigen value 610 associated with the connected node. It should be noted that in this embodiment, the method of calculating the eigen value of the edge is not limited.

The estimation module 312 sets the calculated eigen value of the edge for the diagonal components corresponding to the edge (Step S608).

The estimation module 312 determines whether or not the processing of all of the connected nodes specified in Step S603 is complete (Step S609). When it is determined that the processing of all of the connected nodes specified in Step S603 is not complete, the processing returns to Step S604, and the estimation module 312 executes the same processing on a new connected node.

When it is determined that the processing of all of the connected nodes specified in Step S603 is complete, the estimation module 312 determines whether or not the processing of all of the task nodes is complete (Step S610).

When it is determined that the processing of all of the task nodes is not complete, the processing returns to Step S602, and the estimation module 312 executes the same processing on a new task node. On the other hand, when it is determined that the processing of all of the task nodes is complete, the estimation module 312 finishes the processing.

The above is a description of the generation processing of the superposition matrix.

According to the fourth embodiment, the performance limit of the operations system can be estimated in consideration of information on the physical layer, logical layer, and task layer. It should be noted that the fourth embodiment may be provided using the same method as in the third embodiment.

Fifth Embodiment

In a fifth embodiment of this invention, the management server 100 incorporates impact range data into template information to be used when building the operations system.

In the related art, the configuration of the operations system is managed as template information. The template information is, for example, data in an extensible markup language (XML) format. The management server 100 incorporates the result of counting processing into template information corresponding to an operations system that has carried out a stress test.

The system configuration and the configuration of the blade servers 223 in the fifth embodiment are the same as in the first embodiment, and hence a description thereof is omitted here. A part of the configuration of the management server 100 of the fifth embodiment is different.

Figure 23:
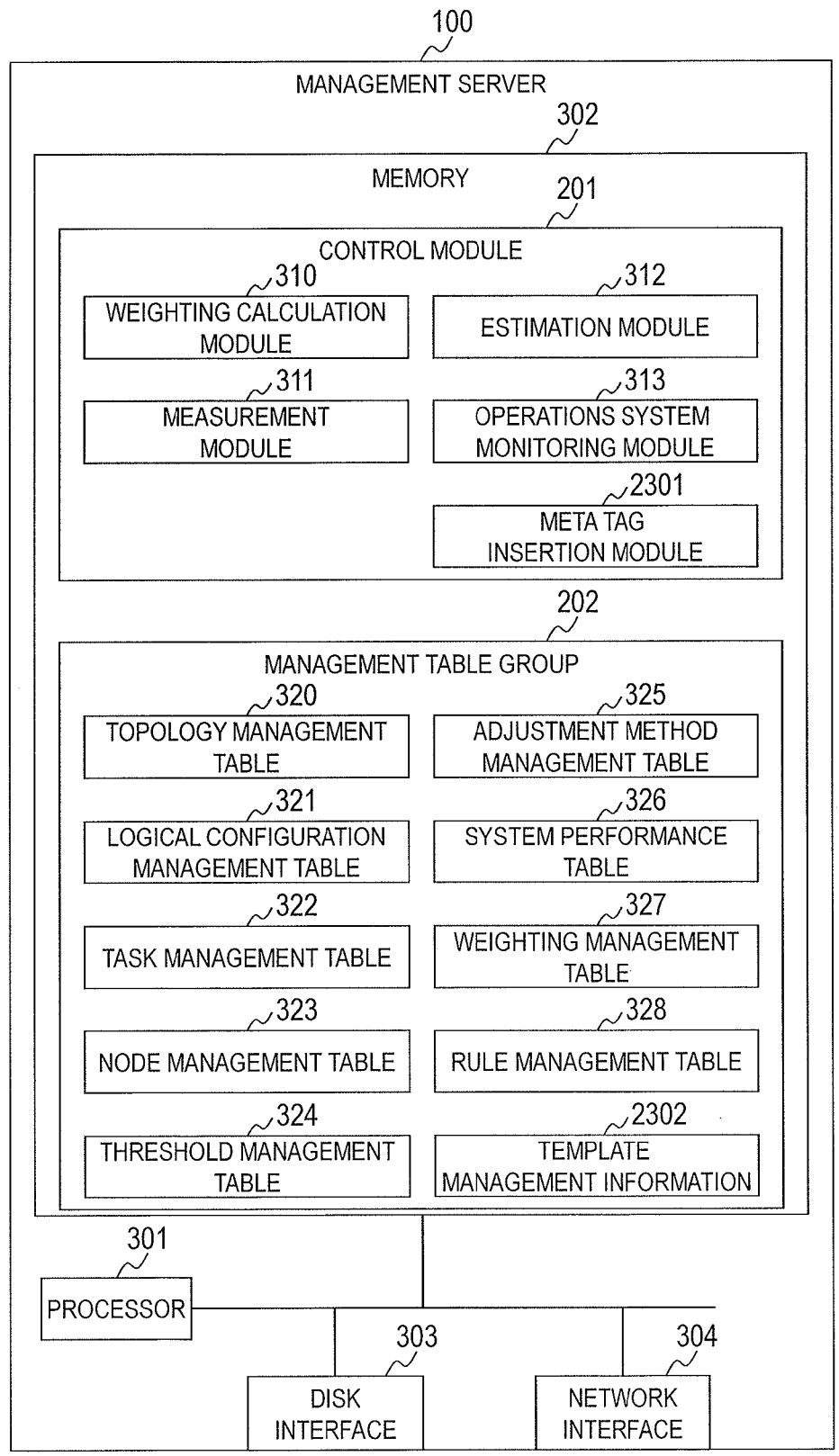
FIG. 23 is a block diagram for illustrating a configuration example of the management server of a fifth embodiment.

FIG. 23 is a block diagram for illustrating a configuration example of the management server 100 of the fifth embodiment.

The hardware configuration of the management server 100 is the same as in the first embodiment, and hence a description thereof is omitted here. In the fifth embodiment, the control module 201 includes a meta tag insertion module 2301. Further, the management table group 202 of the fifth embodiment includes template management information 2302.

The template management information 2302 stores information on the configuration of the operations system. Specifically, the template management information 2302 includes a plurality of entries in which identification information on the operations system and template information representing the configuration of the operations system are associated with each other. In this embodiment, the template information is data in the XML format.

The meta tag insertion module 2301 is configured to generate a meta tag (meta information) based on the result of the counting processing, and insert the generated meta tag into a meta tag of the template information. Details of the processing executed by the meta tag insertion module 2301 are described later with reference to FIG. 24.

The remaining configuration is the same as in the first embodiment, and hence a description thereof is omitted here. Further, the node selection processing, measurement processing, counting processing, and monitoring processing of the fifth embodiment are the same as in the first embodiment, and hence a description thereof is omitted here.

Figure 24:
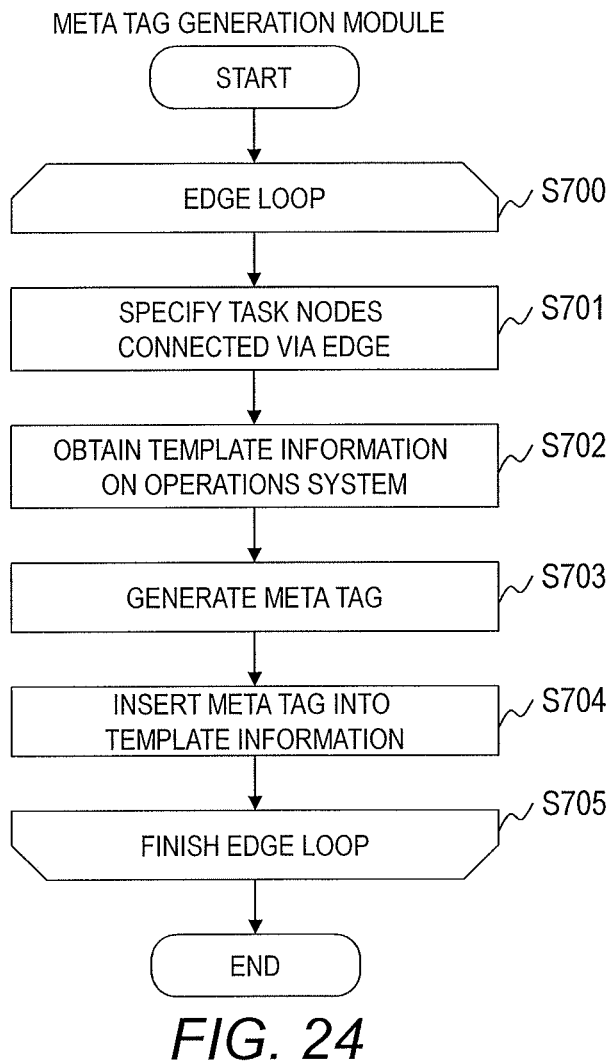
FIG. 24 is a flowchart for illustrating an example of meta tag generation processing of the fifth embodiment.

FIG. 24 is a flowchart for illustrating an example of the meta tag generation processing of the fifth embodiment.

The meta tag insertion module 2301 of the control module 201 starts the meta tag generation processing after the counting processing has finished.

First, the meta tag insertion module 2301 starts loop processing of the edges (Step S700). At this stage, the meta tag insertion module 2301 refers to the weighting management table 327, and selects one entry having "edge" stored in the type 1202.

The meta tag insertion module 2301 specifies two task nodes that are connected via the edge corresponding to the selected entry (Step S701).

Specifically, the meta tag insertion module 2301 refers to the task node identifier 1204 of the selected entry, and specifies the two task nodes connected via the edge corresponding to the selected entry.

The meta tag insertion module 2301 obtains the template information corresponding to the operations system that carried out the stress test from the template management information 2302 (Step S702). The meta tag insertion module 2301 generates a meta tag relating to the edge and a meta tag relating to the two task nodes connected via the edge (Step S703). For example, meta tags such as the following are generated.

The meta tag insertion module 2301 generates a meta tag including information on the edge and a meta tag including information on the two task nodes.

Further, the meta tag insertion module 2301 refers to the system performance table 326, and generates a meta tag representing the value of the performance limit of the two task nodes. The meta tag insertion module 2301 retrieves the row having an important node identifier 1102 and an associated node identifier 1103 that match the identifiers of the two task nodes, and obtains the function stored in the function 1106 of that row. In addition, based on the function, the meta tag insertion module 2301 calculates a value X that saturates the response time of the system, and generates a meta tag including the percentile of that value.

The meta tag insertion module 2301 inserts the generated meta tag into the obtained template information (Step S704). The meta tag insertion module 2301 determines whether or not processing on all of the edges is complete (Step S705).

When it is determined that processing on all of the edges is not complete, the processing returns to Step S700, and the meta tag insertion module 2301 executes the same processing on a new edge. When it is determined that processing on all of the edges is complete, the meta tag insertion module 2301 finishes the processing.

According to the fifth embodiment, the measurement result of the stress test of the operations system can be inserted into template information to be used when generating the operations system. As a result, a performance characteristic of the operations system can be grasped at the time of building the operations system, and, the system configuration and the like required to build the operations system can be grasped.

For example, when creating a virtual computer during building of the operations system, a system that gives consideration to a performance characteristic such as open virtualization format (OVF) can be built. Therefore, the portability and migratability of the system can be improved.

Meta tags include a method of responding to any of the physical nodes, logical nodes, and task nodes, and hence when a performance failure has occurred in the computer system or operations system, the failure can be handled in a rapid and correct manner based on the meta tag.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:
1. A system management method for a management computer coupled to a computer system,
the management computer including:
a first processor;
a first memory coupled to the first processor; and
a first interface coupled to the first processor,
the computer system including a plurality of computers,
each of the plurality of computers including:
a second processor;
a second memory coupled to the second processor; and
a second interface coupled to the second processor,
an operations system being built thereon the computer system,
the operations system including a plurality of task nodes each having allocated thereto one of computer resources of one computer among the plurality of computers and computer resources of a virtual computer generated on at least one computer among the plurality of computers,
the system management method including:
a first step of analyzing, by the management computer, a configuration of the computer system for specifying at least one important node, which is an important task node in the operations system;
a second step of changing, by the management computer, an allocation amount of the computer resources allocated to the at least one important node for measuring a load of the operations system;
a third step of calculating, by the management computer, a first weighting representing a strength of associations among the plurality of task nodes based on a measurement result of the load; and
a fourth step of specifying, by the management computer, a range impacted by a change in the load of the at least one important node based on the calculated first weighting;
wherein the management computer stores:
topology management information for managing an apparatus configuration of each of the plurality of computers and a coupling configuration of the plurality of computers;
logical configuration management information for managing an apparatus configuration of a plurality of virtual computers and a coupling configuration of the plurality of virtual computers; and
node management information for managing a connection configuration of the plurality of task nodes, and, a correspondence relationship of the one computer and the virtual computer allocating the computer resources to each of the plurality of task nodes,
wherein the topology management information includes a first eigen value representing an importance level of a physical configuration in the computer system, the first eigen value being set based on the apparatus configuration of each of the plurality of computers and the coupling configuration of each of the plurality of computers,
wherein the logical configuration management information includes a second eigen value representing an importance level of a logical configuration in the computer system, the second eigen value being set based on the apparatus configuration of the plurality of virtual computers and the coupling relationship of each of the plurality of virtual computers, and
wherein the first step includes:
referring to the node management information for specifying, for each of the plurality of task nodes, the one computer and the virtual computer allocating the computer resources to the each of the plurality of task nodes;
referring, for a task node to be allocated with the computer resources of the one computer, to the topology management information for obtaining the at least one first eigen value associated with the one computer allocating the computer resources to the task node, and calculating a second weighting representing an importance level of the task node to be allocated with the computer resources of the one computer based on the at least one first eigen value;
referring, for a task node to be allocated with the computer resources of the virtual computer, to the logical configuration management information for obtaining the at least one second eigen value associated with the virtual computer allocating the computer resources to the task node, referring to the logical configuration management information and the topology management information for obtaining the at least one first eigen value associated with a computer generated by the virtual computer allocating the computer resources to the task node, and calculating the second weighting based on the at least one first eigen value and the at least one second eigen value;

specifying at least one of the important nodes from among the plurality of task nodes based on the second weighting of each of the plurality of task nodes;

wherein the second step includes:

selecting one important node to be processed from among the at least one important node; and changing the allocation amount of the computer resources to be allocated to the important node to be processed for measuring the load of each of the plurality of task nodes.

2. The system management method according to claim 1, wherein the second step includes:

calculating, based on a measurement result of the load, a performance characteristic function representing an association between the allocation amount of the computer resources to be allocated to the important node to be processed and the load of each of the plurality of task nodes, and wherein the third step includes generating an association matrix including the first weighting as an off-diagonal component value and the second weighting as a diagonal component value.

3. The system management method according to claim 2, wherein each of the plurality of task nodes is configured to execute a predetermined task, wherein the management computer stores task management information in which a type of task to be executed by the operations system, a configuration required for the task, and a fourth eigen value representing an importance level of the task are associated with one another, and wherein the fourth step includes:

referring to the node management information for selecting one task node to be processed;

referring to the node management information for specifying a connected node, which is a task node connected to the task node to be processed;

obtaining, based on the node management information and the task management information, the fourth eigen value corresponding to the type of the task to be executed by the task node to be processed and the fourth eigen value corresponding to the type of the task to be executed by the connected node;

calculating a second weighting representing a strength of an association between the task node to be processed and the connected node by using the fourth eigen value of the task node to be processed and the fourth eigen value of the connected node;

generating a superposition matrix including the second weighting as an off-diagonal component value and a eigen value of the task node as a diagonal component value; and correcting the association matrix by using the superposition matrix.

4. The system management method according to claim 2, wherein each of the plurality of task nodes is configured to execute a predetermined task, wherein the management computer stores rule management information in which a type of the task and a method of changing the computer resources to be allocated to the task node executing the task are associated with one another, and wherein the system management method further includes:

monitoring, by the management computer, a load of each of the plurality of task nodes included in the impacted range;

estimating, by the management computer, a critical value representing a possibility of the computer resources of each of the plurality of task nodes being insufficient by using a value of the load of each of the plurality of task nodes and the performance characteristic function;

determining, by the management computer, for each of the plurality of task nodes, whether or not there is a first task node having an estimated critical value equal to or more than a first threshold;

referring, by the management computer, to the rule management information for specifying a method of changing the computer resources corresponding to the type of the task to be executed by the first task node in a case where there is the first task node having an estimated critical value equal to or more than the first threshold; and generating, by the management computer, information for displaying the specified method of changing the computer resources.

5. The system management method according to claim 2, wherein the management computer stores template information storing information required to build the operations system, and wherein the system management method further includes:

specifying, by the management computer, a plurality of task nodes that are associated with each other based on the first weighting;

generating, by the management computer, meta information including a connecting relationship of the specified plurality of task nodes and a measurement result of the load; and adding, by the management computer, the meta information to the template information.

6. A management computer coupled to a computer system including a plurality of computers, the management computer comprising:

a first processor;

a first memory coupled to the first processor; and a first interface coupled to the first processor, each of the plurality of computers including:

a second processor;

a second memory coupled to the second processor; and a second interface coupled to the second processor, an operations system being built thereon the computer system, the operations system including a plurality of task nodes each having allocated thereto one of computer resources of one computer among the plurality of computers and computer resources of a virtual computer generated on at least one computer among the plurality of computers, the management computer comprising:

a weighting calculation module configured to analyze a configuration of the computer system, to thereby calculate a first weighting representing an importance level of each of the plurality of task nodes, and to specify at least one important node, which is an important task node in the operations system, based on the first weighting;

a measurement module configured to change an allocation amount of the computer resources allocated to the at least one important node and measure a load of the operations system; and an estimation module configured to calculate a second weighting representing a strength of associations among the plurality of task nodes based on a measurement result of the load, and specify a range impacted by a change in the load of the at least one important node based on the calculated second weighting;

wherein the management computer stores:

topology management information for managing an apparatus configuration of each of the plurality of computers and a coupling configuration of the plurality of computers;

logical configuration management information for managing an apparatus configuration of a plurality of virtual computers and a coupling configuration of the plurality of virtual computers; and node management information for managing a connection configuration of the plurality of task nodes, and, a correspondence relationship of the one computer and the virtual computer allocating the computer resources to each of the plurality of task nodes, wherein the topology management information includes a first eigen value representing an importance level of a physical configuration in the computer system, the first eigen value being set based on the apparatus configuration of each of the plurality of computers and the coupling configuration of each of the plurality of computers, wherein the logical configuration management information includes a second eigen value representing an importance level of a logical configuration in the computer system, the second eigen value being set based on the apparatus configuration of the plurality of virtual computers and the coupling relationship of each of the plurality of virtual computers, and wherein the weighting calculation module is configured to:

refer to the node management information for specifying, for each of the plurality of task nodes, the one computer and the virtual computer allocating the computer resources to the each of the plurality of task nodes;

refer, for a task node to be allocated with the computer resources of the one computer, to the topology management information for obtaining the at least one first eigen value associated with the one computer allocating the computer resources to the task node, and calculate the first weighting based on the at least one first eigen value;

refer, for a task node to be allocated with the computer resources of the virtual computer, to the logical configuration management information for obtaining the at least one second eigen value associated with the virtual computer allocating the computer resources to the task node, refer to the logical configuration management information and the topology management information for obtaining the at least one first eigen value associated with a computer generated by the virtual computer allocating the computer resources to the task node, and calculate the first weighting based on the at least one first eigen value and the at least one second eigen value;

specify at least one of the important nodes from among the plurality of task nodes based on the second weighting of each of the plurality of task nodes;

wherein the measurement module is configured to:

select one important node to be processed from among the at least one important node; and change the allocation amount of the computer resources to be allocated to the important node to be processed for measuring the load of each of the plurality of task nodes.

7. The management computer according to claim 6, wherein the measurement module is configured to:

calculate, based on a measurement result of the load, a performance characteristic function representing an association between the allocation amount of the computer resources to be allocated to the important node to be processed and the load of each of the plurality of task nodes, and wherein the estimation module is configured to generate an association matrix including the second weighting as an off-diagonal component value and the first weighting as a diagonal component value.

8. The management computer according to claim 7, wherein each of the plurality of task nodes is configured to execute a predetermined task, wherein the management computer stores task management information in which a type of task to be executed by the operations system, a configuration required for the task, and a fourth eigen value representing an importance level of the task are associated with one another, and wherein the estimation module is configured to:

refer to the node management information for selecting one task node to be processed;

refer to the node management information for specifying a connected node, which is a task node connected to the task node to be processed;

obtain, based on the node management information and the task management information, the fourth eigen value corresponding to the type of the task to be executed by the task node to be processed and the fourth eigen value corresponding to the type of the task to be executed by the connected node;

calculate a second weighting representing a strength of an association between the task node to be processed and the connected node by using the fourth eigen value of the task node to be processed and the fourth eigen value of the connected node;

generate a superposition matrix including the second weighting as an off-diagonal component value and a eigen value of the task node as a diagonal component value; and correct the association matrix by using the superposition matrix.

9. The management computer according to claim 7, wherein each of the plurality of task nodes is configured to execute a predetermined task, wherein the management computer stores rule management information in which a type of the task and a method of changing the computer resources to be allocated to the task node executing the task are associated with one another, wherein the management computer further comprises an operations system monitoring module configured to monitor the operations system based on the measurement result of the load, and wherein the operations system monitoring module is configured to:

monitor a load of each of the plurality of task nodes included in the impacted range;

estimate a critical value representing a possibility of the computer resources of each of the plurality of task nodes being insufficient by using a value of the load of each of the plurality of task nodes and the performance characteristic function;

determine, for each of the plurality of task nodes, whether or not there is a first task node having an estimated critical value equal to or more than a first threshold;

refer to the rule management information for specifying a method of changing the computer resources corresponding to the type of the task to be executed by the first task node in a case where there is the first task node having an estimated critical value equal to or more than the first threshold; and generate information for displaying the specified method of changing the computer resources.

10. The management computer according to claim 7,
wherein the management computer stores template information storing information required to build the operations system,
wherein the management computer further comprises a meta information insertion module configured to generate meta information including the measurement result of the load, and
wherein the meta information insertion module is configured to:
specify a plurality of task nodes that are associated with each other based on the second weighting;
generate meta information including a connection relationship of the specified plurality of task nodes and the measurement result of the load; and
add the meta information to the template information.

11. A non-transitory computer-readable storage medium having stored thereon a program to be executed by a management computer coupled to a computer system,
the management computer including:
a first processor;
a first memory coupled to the first processor; and
a first interface coupled to the first processor,
the computer system including a plurality of computers, each of the plurality of computers including:
a second processor;
a second memory coupled to the second processor; and
a second interface coupled to the second processor,
an operations system being built thereon the computer system,
the operations system including a plurality of task nodes each having allocated thereto one of computer resources of one computer among the plurality of computers and computer resources of a virtual computer generated on at least one computer among the plurality of computers,
the non-transitory computer-readable storage medium having stored thereon a program for controlling the management computer to execute:
a first procedure of analyzing a configuration of the computer system for specifying at least one important node, which is an important task node in the operations system;
a second procedure of changing an allocation amount of the computer resources allocated to the at least one important node for measuring a load of the operations system;
a third procedure of calculating a first weighting representing a strength of associations among the plurality of task nodes based on a measurement result of the load; and a fourth procedure of specifying a range impacted by a change in the load of the at least one important node based on the calculated first weighting;
wherein the management computer stores:
topology management information for managing an apparatus configuration of each of the plurality of computers and a coupling configuration of the plurality of computers;
logical configuration management information for managing an apparatus configuration of a plurality of virtual computers and a coupling configuration of the plurality of virtual computers; and
node management information for managing a connection configuration of the plurality of task nodes, and, a correspondence relationship of the one computer and the virtual computer allocating the computer resources to each of the plurality of task nodes,
wherein the topology management information includes a first eigen value representing an importance level of a physical configuration in the computer system, the first eigen value being set based on the apparatus configuration of each of the plurality of computers and the coupling configuration of each of the plurality of computers,
wherein the logical configuration management information includes a second eigen value representing an importance level of a logical configuration in the computer system, the second eigen value being set based on the apparatus configuration of the plurality of virtual computers and the coupling relationship of each of the plurality of virtual computers, and
wherein the first procedure includes the procedures of:
referring to the node management information for specifying, for each of the plurality of task nodes, the one computer and the virtual computer allocating the computer resources to the each of the plurality of task nodes;
referring, for a task node to be allocated with the computer resources of the one computer, to the topology management information for obtaining the at least one first eigen value associated with the one computer allocating the computer resources to the task node and, calculating a second weighting representing an importance level of the task node to be allocated with the computer resources of the one computer based on the at least one first eigen value;
referring, for a task node to be allocated with the computer resources of the virtual computer, to the logical configuration management information for obtaining the at least one second eigen value associated with the virtual computer allocating the computer resources to the task node, referring to the logical configuration management information and the topology management information for obtaining the at least one first eigen value associated with a computer generated by the virtual computer allocating the computer resources to the task node, and calculating the second weighting based on the at least one first eigen value and the at least one second eigen value;
specifying at least one of the important nodes from among the plurality of task nodes based on the second weighting of each of the plurality of task nodes;
wherein the second procedure includes the procedures of:
selecting one important node to be processed from among the at least one important node; and changing the allocation amount of the computer resources to be allocated to the important node to be processed for measuring the load of each the plurality of task nodes.

12. The non-transitory computer-readable storage medium according to claim 11,
wherein the second procedure includes the procedures of:
calculating, based on a measurement result of the load, a performance characteristic function representing an association between the allocation amount of the computer resources to be allocated to the important node to be processed and the load of each of the plurality of task nodes, and
wherein the third procedure includes a procedure of generating an association matrix including the first weighting as an off-diagonal component value and the second weighting as a diagonal component value.

\* \* \* \* \*